United States Patent
Ruffino et al.

(10) Patent No.: US 12,223,053 B2
(45) Date of Patent: Feb. 11, 2025

(54) DETECTION AND REMEDIATION OF UNAUTHORIZED BOOT OF STORAGE MEDIA

(71) Applicant: SOFTIRON LIMITED, Chilworth (GB)

(72) Inventors: Charles C. Ruffino, Menifee, CA (US); Stephen Hardwick, Austin, TX (US); Mark Chen, Newark, CA (US)

(73) Assignee: SOFTIRON LIMITED, London (GB)

( * ) Notice: Subject to any disclaimer, the term of this patent is extended or adjusted under 35 U.S.C. 154(b) by 136 days.

(21) Appl. No.: 17/750,528

(22) Filed: May 23, 2022

(65) Prior Publication Data

US 2022/0391513 A1 Dec. 8, 2022

Related U.S. Application Data

(60) Provisional application No. 63/196,881, filed on Jun. 4, 2021.

(51) Int. Cl.
*G06F 21/57* (2013.01)
*H04L 9/08* (2006.01)

(52) U.S. Cl.
CPC ......... *G06F 21/575* (2013.01); *H04L 9/0894* (2013.01); *G06F 2221/2143* (2013.01)

(58) Field of Classification Search
CPC ............. G06F 11/1433; G06F 11/1417; G06F 21/575; G06F 2221/2143; H04L 9/0894
USPC ............................................................ 713/2
See application file for complete search history.

(56) References Cited

U.S. PATENT DOCUMENTS

| | | | |
|---|---|---|---|
| 2007/0180314 A1 | 8/2007 | Kawashima et al. | 714/15 |
| 2007/0300293 A1* | 12/2007 | Tsutsui | G06F 21/32 726/5 |
| 2009/0248827 A1* | 10/2009 | Hazra | G06F 21/88 709/207 |

(Continued)

FOREIGN PATENT DOCUMENTS

| | | | |
|---|---|---|---|
| CN | 105915637 A | 8/2016 | H04L 12/10 |
| EP | 2613262 A2 | 7/2013 | G06F 1/32 |

(Continued)

OTHER PUBLICATIONS

International Search Report and Written Opinion, Application No. PCT/EP/2021/072206, 12 pages, Nov. 10, 2021.

(Continued)

*Primary Examiner* — Brian T Misiura
(74) *Attorney, Agent, or Firm* — Slayden Grubert Beard PLLC

(57) ABSTRACT

An apparatus includes a cryptographic key for decrypting content to be read from a storage media, and a control circuit. The control circuit is configured to, upon a boot of a server, dynamically generate a new boot authentication code using a prescribed method and determine a reconstituted boot authentication code. The reconstituted boot authentication code was reconstituted from an initial boot authentication code that was previously generated using the prescribed method. The control circuit is configured to compare the new and reconstituted boot authentication codes, and, based on a determination that the new and reconstituted boot authentication codes do not match, take a corrective action.

28 Claims, 10 Drawing Sheets

(56) References Cited

U.S. PATENT DOCUMENTS

| | | | |
|---|---|---|---|
| 2009/0260081 A1 | 10/2009 | Johnson et al. ............... 726/22 |
| 2013/0212413 A1 | 8/2013 | Berndt et al. ................ 713/310 |
| 2013/0254588 A1 | 9/2013 | Fujieda ....................... 714/4.11 |
| 2014/0181490 A1* | 6/2014 | Campbell ............. G06F 9/4406 |
| | | | 713/2 |
| 2017/0230179 A1 | 8/2017 | Mannan et al. |
| 2018/0267858 A1 | 9/2018 | Bacha et al. |
| 2019/0005274 A1 | 1/2019 | Field et al. |
| 2019/0156039 A1 | 5/2019 | Harsany et al. |
| 2019/0166032 A1 | 5/2019 | Inbaraj et al. |
| 2020/0097057 A1 | 3/2020 | Tseng et al. |
| 2020/0143047 A1 | 5/2020 | Shivanna |
| 2020/0279043 A1 | 9/2020 | Thornton et al. |
| 2021/0110037 A1 | 4/2021 | Hunt et al. |
| 2021/0111887 A1 | 4/2021 | Higley et al. |
| 2022/0376911 A1* | 11/2022 | Ruffino .................. H04L 9/083 |

FOREIGN PATENT DOCUMENTS

| | | | | |
|---|---|---|---|---|
| EP | 2642388 A1 | 9/2013 | ............. G06F 11/20 |
| EP | 2645294 A1 | 10/2013 | ............. G06F 21/57 |
| EP | 3486824 A1 | 5/2019 | ............. G06F 21/56 |

OTHER PUBLICATIONS

International Search Report and Written Opinion, Application No. PCT/EP2021/073538, 11 pages, Dec. 9, 2021.

Taylor, Michael A. et al., "Sensor-Based Ransomware Detection," Future Technologies Conference, URL: https://saiconference.com/Downloads/FTC2017/Proceedings/112_Paper_254-Sensor-based_Ransomware_Detection.pdf, pp. 794-801, Nov. 30, 2017.

Hull, Gavin et al., "Ransomware Deployment Methods and Analysis: Views from a Predictive Model and Human Responses," Crime Science, vol. 8, No. 1, 22 pages, Feb. 12, 2019.

International Search Report and Written Opinion, Application No. PCT/EP2022/064122, 12 pages, Aug. 30, 2022.

U.S. Non-Final Office Action, U.S. Appl. No. 17/396,927, 23 pages, filed Sep. 1, 2022.

U.S. Non-Final Office Action, U.S. Appl. No. 17/751,074, 31 pages, filed Oct. 20, 2022.

U.S. Non-Final Office Action, U.S. Appl. No. 17/410,290, 37 pages, filed Nov. 14, 2022.

International Search Report and Written Opinion, Application No. PCT/EP2022/064351, 11 pages, Sep. 28, 2022.

* cited by examiner

DETECTION AND REMEDIATION OF UNAUTHORIZED BOOT OF STORAGE MEDIA

PRIORITY

This application claims priority to U.S. Provisional Patent Application No. 63/196,881 filed Jun. 4, 2021, the contents of which are hereby incorporated in their entirety.

FIELD OF THE INVENTION

The present disclosure relates to electronic data storage and, more particularly, to detection and remediation of unauthorized boot of storage media.

BACKGROUND

Data erasure of software defined storage (SDS) information at the storage level can be difficult to achieve. Ensuring that data can be securely destroyed in an SDS implementation can be difficult to achieve. The challenge is that the system is designed to specifically overcome the loss of data. The system may include several storage devices assembled into a cluster. A well accepted method of erasing data is to use a cryptographic erase. This may involve encrypting data that is written onto a storage device and then securely deleting the key. A common issue in cryptographic erase is how to recover the storage encryption key if the storage encryption key is accidentally destroyed.

There are many instances where storing a security credential is problematic. A security credential may be stored so as to provide a backup in case an erase of the credential was made accidentally, wherein such an erase might otherwise have been intended to perform, for example, a secure erase. Take as an example, use of encryption keys to protect the contents of a storage medium. To perform a cryptographic erasure, all instances of the data encryption key must be destroyed. However, many users may be worried that accidental destruction of all instances of the key would result in the lack of access to the data on the encrypted medium. Consequently, copies of the encryption key might be stored elsewhere. However, storing additional keys in other locations might itself present a security threat. Further, any existing instances of the encryption key might invalidate the cryptographic erasure. Moreover, unauthorized boot of storage media may present a threat to the operation of systems. In addition, storage media, when removed without authorization, may present a threat to the operation of systems.

Embodiments of the present disclosure may address one or more of these challenges.

DETAILED DESCRIPTION

Figure 1:
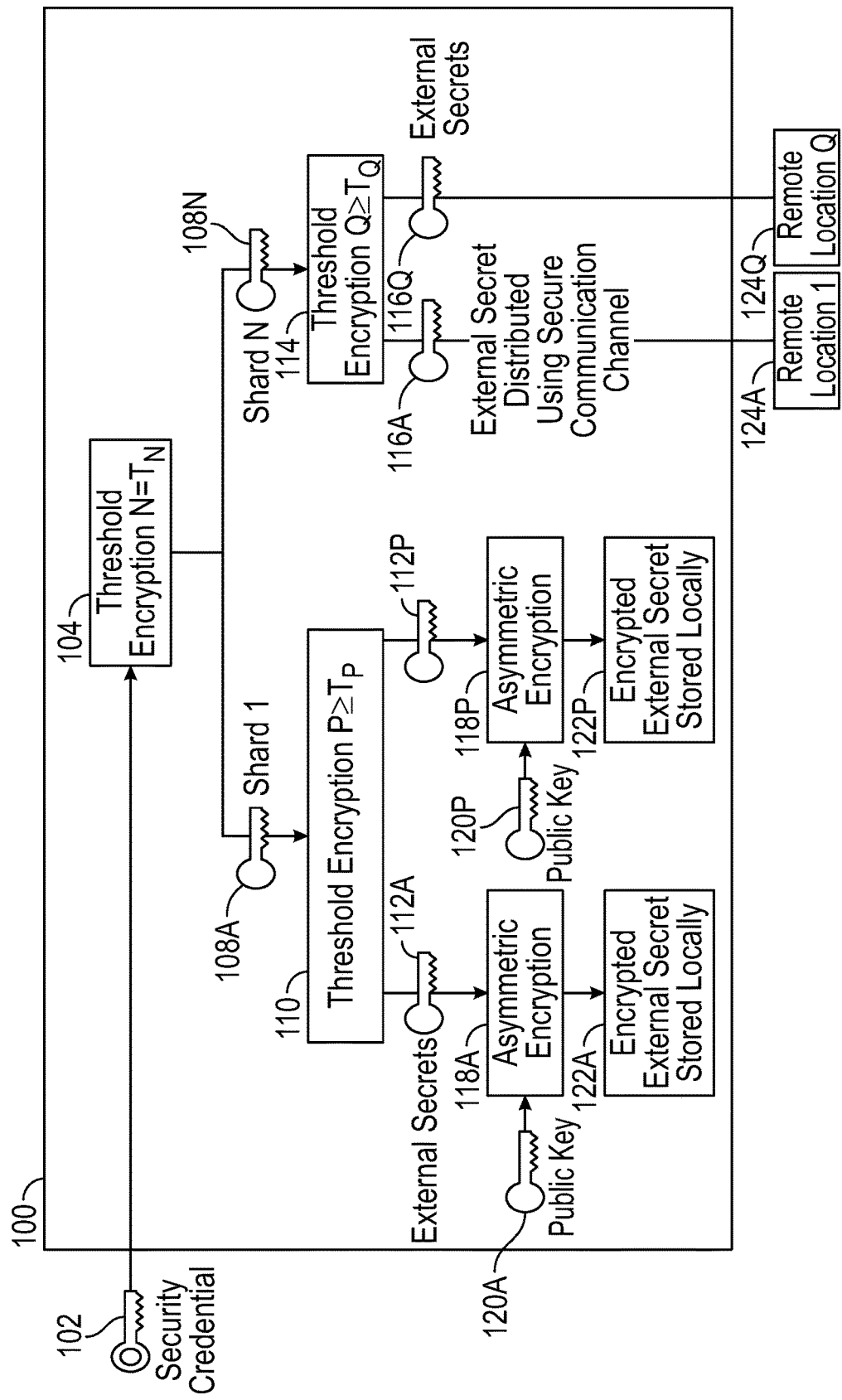
FIG. 1 is an illustration of a process for generating a distributed secret for a security credential, according to embodiments of the present disclosure.

FIG. 1 is an illustration of a process for generating a distributed secret for a security credential, according to embodiments of the present disclosure.

As shown in FIG. 1, a security credential 102 is provided to a system 100. System 100 may be a threshold encryption system. System 100 may include a processor (not shown) and a machine-readable, non-transitory medium (not shown). The medium may include instructions that, when loaded and executed by the processor, may cause system 100 to perform the functionality as described herein. Moreover, the functionality described herein may be implemented in any suitable manner, such as by analog circuitry, digital circuitry, control logic, instructions for execution by a processor, digital logic circuits programmed through hardware description language, application specific integrated circuits (ASIC), field programmable gate arrays (FPGA), programmable logic devices (PLD), or any suitable combination thereof, whether in a unitary device or spread over several devices.

System 100 may be configured to convert a security credential 102 using threshold encryption function circuit 104.

Security credential 102 may include any suitable information for authentication. Security credential 102 may include, for example, a cryptographic key. The key may be symmetric or asymmetric, and public or private. In other cases, security credential 102 may include, for example, a cryptographic hash, password, or passcode.

Function circuit 104 may be implemented in any suitable manner, such as by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

Function circuit 104 may be used for use cases wherein $N=T_N$. As discussed above, when $N=T_N$, simple sharding may be used, wherein all shards are needed to reconstitute the original security credential. Function circuit 104 may be configured to convert security credential 102 into multiple shards 1 (108A) through N (108N). Although a shard is shown as the derivative of security credential 102, any suitable derivative of security credential 102 may be used. Function circuit 104 may be performed in such a way that the number of shards created by function circuit 104 is equal to the number of shards required to reconstitute security credential 102. Therefore, if N derivatives are created by the application of function circuit 104 security credential 102, and $T_N$ derivatives are needed to reconstitute security credential 102, then $N=T_N$. Function circuit 104 may perform this in any suitable manner. Function circuit 104 may perform this by splitting an initial copy of security credential 102 into subsets of the original data by using filters to generate shards 108A-108N. Once shards 108A-108N are created, the original copy of security credential 102 may be completely destroyed by, for example, being overwritten.

Next, threshold encryption $P \geq T_P$ function circuit 110 and threshold encryption $Q \geq T_Q$ function circuit 114 may be configured to create derivatives from each of shards 108A, 108N. More functions, not shown, may be used to create derivates from the intervening shards between shards 108A, 108N. Each such function may have its own quantity of derivates created (such as P or Q) and corresponding threshold values (such as $T_P$ or $T_Q$). Function circuits 110, 114 and other functions not shown for creating derivatives from shards 108 may be implemented in any suitable manner, such as by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. Function circuits 110, 114 and other functions not shown for creating derivatives from shards 108 may create derivatives such that fewer derivatives, given by T, are needed to reconstitute the original input. For function circuits 110, 114, the original input is given by P and Q, respectively. Thus, function circuits 110, 114 may be referred to as $P \geq T_P$ and $Q \geq T_Q$, respectively. Function circuit 110 may be configured to generate a quantity (P) of secrets 112A-112P from shard 108A. Similarly, function circuit 114 may be configured to generate a quantity (Q) of secrets 116A-116Q from shard 108N. Other functions not shown for creating derivatives from shards 108 may similar quantities of secrets from respective shards 108 that are greater than the number of derivatives needed to reconstitute the respective shard 108. Function circuits 110, 114 may use, for example, Shamir's Secret Sharing Scheme to generate the secrets from the shards. The secrets may be implemented in any suitable information representation. The actual value for P or Q, or for the other functions not shown, can differ with each function. Furthermore, P, Q, and T can be different for different instances or applications of a given function.

Thus, P secrets 112 may be generated for shard 108A, and Q secrets 116 may be generated for shard 108N. Not shown are secrets generated for each of the intervening shards 108 (not shown). Secrets 112, 116, and those not shown may be considered to be local secrets or external secrets. A local secret may be stored locally to system 100 for retrieval upon reconstitution of security credential 102. An external secret may be stored externally to system 100 for retrieval upon reconstitution of security credential 102. Secrets 112, 116, and those not shown may be stored in any suitable manner.

In one example, secrets 112, 116, and those not shown may be distributed securely to a remote location using a secure communications channel. Each of secrets 112, 116, and those not shown that are exported may sent to a different remote location. For example, secret 116A may be sent to a remote location 1 124A. Furthermore, external secret 116Q may be sent to remote location 124Q. Local copies of secrets 116A-116Q may destroyed once they have been successfully deposited in remote locations. Remote locations 124 may include any suitable sever, storage, or other system for storing data or information.

In another example, secrets 112, 116, and those not shown may be stored locally. These may be stored in an encrypted manner. For example, secrets 112 may be stored locally in system 100. Each of secrets 112A-112P may have an individual instance of a public key 120A-120P associated with it. There may be a corresponding private key for each public key, as discussed further below. Using asymmetric encryption circuit 118, public keys 120 may be used to create encrypted copies 122 of respective secrets 112. Asymmetric encryption circuit 118 may be implemented in any suitable manner, such as by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. Respective ones of secrets 112 may be destroyed once respective ones of encrypted copies 122 have been created.

Figure 2:
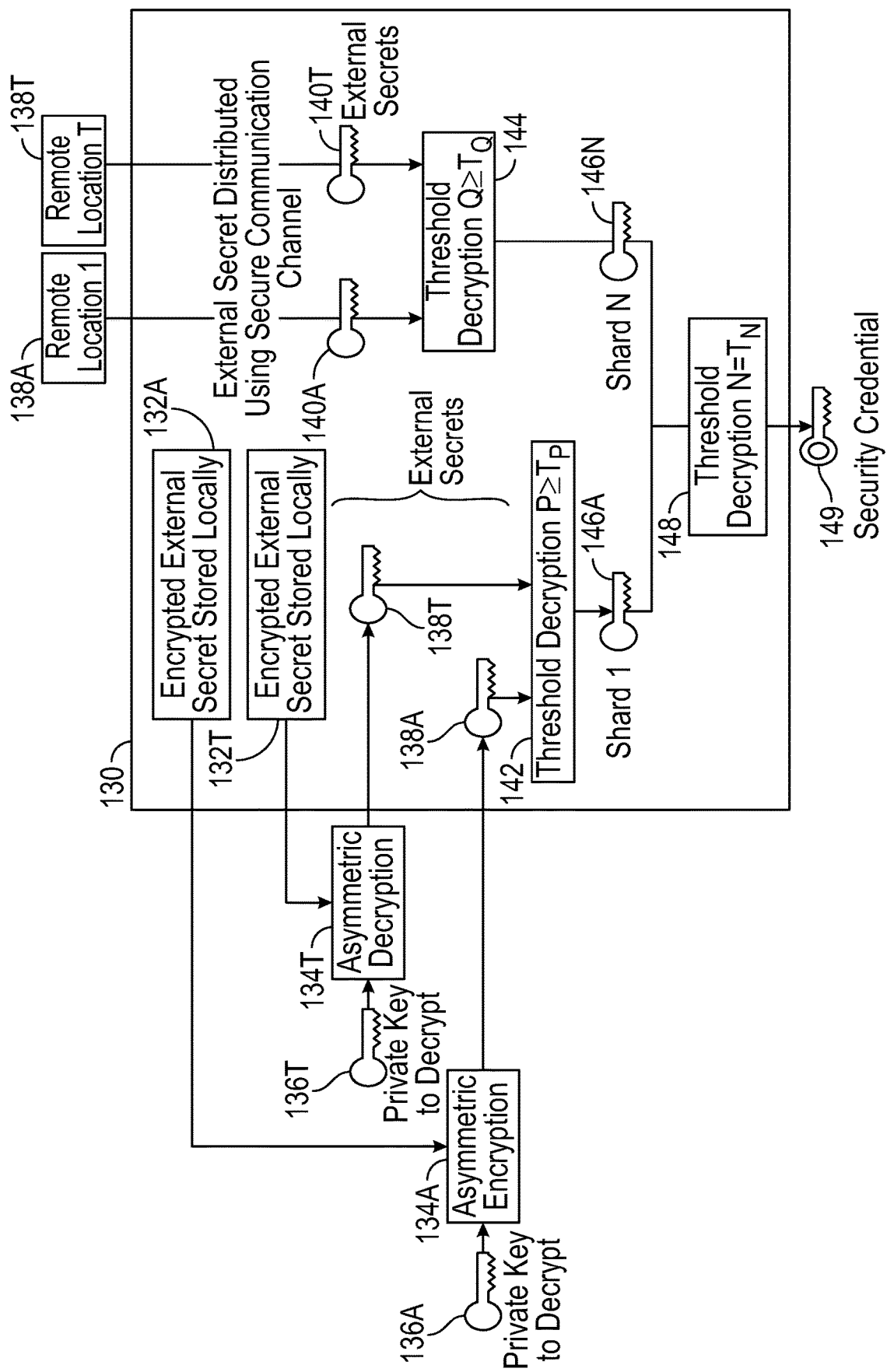
FIG. 2 is an illustration of a process for recovering or reconstituting a distributed secret for a security credential, according to embodiments of the present disclosure.

FIG. 2 is an illustration of a process for recovering or reconstituting a distributed secret for a security credential, according to embodiments of the present disclosure. The security credential may have been securely destroyed. Illustrated in FIG. 2 for recovering or reconstituting a distributed secret for a security credential is a threshold decryption system 130. System 130 may be implemented within system 100, or implemented in a manner that is communicatively coupled and will work with system 100. Threshold decryption system 130 may be implemented in any suitable manner, such as by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

First, any encrypted copies of secrets that were created as shown in FIG. 1 may be restored. As discussed above, it was shown that N shards were created. Then, secrets were created for each shard. The number of secrets created for each shard depended upon the threshold encryption used. A set of quantity P secrets was created by threshold encryption $P \geq T_P$ function circuit 110 and a set of quantity Q secrets was created by threshold encryption function $Q \geq T_Q$ circuit 114. Since creation of secrets was done, for example, using threshold encryption ($P \geq T_P$, $Q \geq T_Q$), only a subset T (which may vary from function to function, such as $T_P$ or $T_Q$) of the original quantity of secrets are needed to recreate the shard. For example, in FIG. 1, shard 1 108A was split by threshold encryption $P \geq T_P$ function circuit 110 into a set of P external secrets 112. Even though a total number of P secrets of secrets 112 were generated, only a total number of $T_P$ secrets of secrets 112 are required to regenerate shard 1 108A. Similarly, a total number of Q secrets of secrets 116 were generated from shard N 108N, and only a total number of $T_P$ secrets of secrets 116 are required to regenerate shard N 108N. Since in threshold encryption circuit 104, N=$T_N$, all shards 1 through N are required to reconstitute security credential 102.

Encrypted external secret stored locally 122A was generated using asymmetric encryption circuit 118A and public key 120A on secret 112A. To restore the locally encrypted secrets, for example, an external secret stored locally 132A may be decrypted off-site. Secret 132A may be sent to an external asymmetric decryption circuit 134A from threshold decryption system 130.

At external asymmetric decryption circuit 134A, using private key 136A, external secret 138A may be decrypted and sent back to threshold decryption system 130. Decryption circuit 134A may use the same algorithm as was used in the asymmetric encryption (such as encryption circuit 118A) used to create secret 132A. Secret 138A may be the reconstitution of one of secrets 112, such as secret 112A. Similarly, encrypted external secret stored locally 132T may be sent to an external asymmetric decryption circuit 134T from threshold decryption system 130. Here, using private key 136T, secret 138T may be decrypted and sent back to threshold decryption system 130. Secret 138T may be the reconstitution of one of secrets 112, such as secret 112P. Moreover, additional intervening encrypted external secrets stored locally 132 (not shown) may be reconstituted using respective asymmetric decryption circuits 134 (not shown) using respective private keys 136 (not shown). There may be $T_P$ secrets 138 to reconstitute the original shard using threshold decryption function P≥$T_P$ circuit 142. If threshold decryption function P≥$T_P$ circuit 142 reconstitutes secrets generated by function threshold encryption function P≥T function circuit 110, then threshold decryption function P≥$T_P$ circuit 142 may use a threshold of $T_P$ secrets 138. Again, $T_P$ may be less than P, the total number of secrets derived from the original shard. P Because the set of $T_P$ secrets 138 that are reconstituted from encrypted external secrets stored locally 132 may be smaller or equal than the number of P secrets 112 that were originally generated, secret 138A might not necessarily correspond, specifically, to secret 112A, and vice-versa; encrypted external secret stored locally 122A might not necessarily correspond, specifically, to encrypted external secret stored locally 132A, and vice-versa; asymmetric decryption circuit 134A might not necessarily correspond, specifically, to asymmetric encryption circuit 118A, and vice-versa; public key 120A might not necessarily correspond, specifically, to private key 136A, and vice-versa. However, each of secrets 112 will correspond to one or more of secrets 138; each of asymmetric encryption circuit 118 will correspond to one or more of asymmetric decryption circuit 134; each of encrypted external secrets stored locally 122 will correspond to one or more of encrypted external secrets stored locally 132; each of private keys 136 will correspond to one or more of public keys 120; each of secrets 138 will correspond to one or more of secrets 112; each of asymmetric decryption circuit 134 will correspond to one or more of asymmetric encryption circuit 118; each of encrypted external secrets stored locally 132 will correspond to one or more of encrypted external secrets stored locally 122; and each of public keys 120 will correspond to one or more of private keys 136. The "one or more" correspondence between the elements of FIGS. 1 and 2 depends upon whether any keys or encryption/decryption routines are reused for multiple secrets.

Next, using secrets 138A-138T (which are a subset of a total number of secrets 138A-138P), a shard 1 146A can be reconstituted using threshold decryption P≥$T_P$ function circuit 142. Shard 1 146A may correspond to shard 1 108A in FIG. 1. Once shard 1 146a has been created, secrets 138A-138T used to reconstitute may be securely destroyed.

Other secrets that have been remotely stored may be retrieved from various external locations 138 where they are stored. Note only T locations might need to return secrets, wherein T corresponds to the threshold of the function used to generate the secrets stored in external locations. Therefore, remote locations 138A-138T may supply secrets 140A-140T to threshold decryption system 130. These may be provided through a secure or encrypted communications channel. Using secrets 140, the original shard N 146N can be reconstituted using threshold decryption function Q≥$T_Q$ circuit 144. Once shard N 146N has been created, all secrets 140 used to reconstitute may be securely destroyed. There may be $T_Q$ secrets 140 to reconstitute the original shard using threshold decryption function Q≥$T_Q$ circuit 144. If threshold decryption function Q≥$T_Q$ circuit 144 reconstitutes secrets generated by function threshold encryption function Q≥$T_Q$ circuit 114, then threshold decryption function Q≥$T_Q$ circuit 144 may use a threshold of $T_Q$ secrets 140.

Because only a subset of secrets (such as quantity $T_Q$) is needed to reconstitute the shard, only a subset of remote locations 138 (quantity $T_Q$) need to yield the remotely stored secrets. Accordingly, remote locations 124 may correspond to various ones of remote locations 138, though not necessarily in a 1:1 manner. Each of remote locations 124 may correspond to one or more of remote locations 138, and vice-versa. Each of secrets 140 may correspond to one or more of secrets 116, and vice-versa.

Although generation of shard 1 146A through use of locally stored secrets 132 and shard N 146N through use of remotely stored secrets 140 are shown, generation of shards 146 may be performed through any suitable combination of locally or remote stored secrets. These are provided as a mere example. Generation of other shards 146 are not shown in FIG. 2 but may be performed in any suitable manner. N shards 146 may be reconstituted, corresponding to shards 108.

Shards 146 may be used by threshold decryption N=$T_N$ function circuit 148 to reconstitute a security credential 149. Security credential 149, if correctly reconstituted, may be the same as security credential 102. All of the N shards 108 that were created in FIG. 1 by threshold encryption function circuit 104 may be presented to threshold decryption N=$T_N$ function circuit 148 to successfully reconstitute security credential 149. Once security credential 149 has been created, shards 146 may be securely destroyed.

It can be seen from the examples above that there are different methods to distribute the secrets. Although locally encrypted versions and remote storage were used, any other suitable methods may be employed. In one embodiment, the type of distribution may be common to a given shard. For example, secrets 112 derived from shard 1 108A may be encrypted and stored locally, while secrets 116 derived from shard N 108N may be stored remotely. As such a given shard and its associated secrets can be grouped in a "zone." The shard for each zone can be named the zone shard for that particular zone.

Circuits 134, 142, 144, 148 may be implemented in any suitable manner, such as by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

Figure 3:
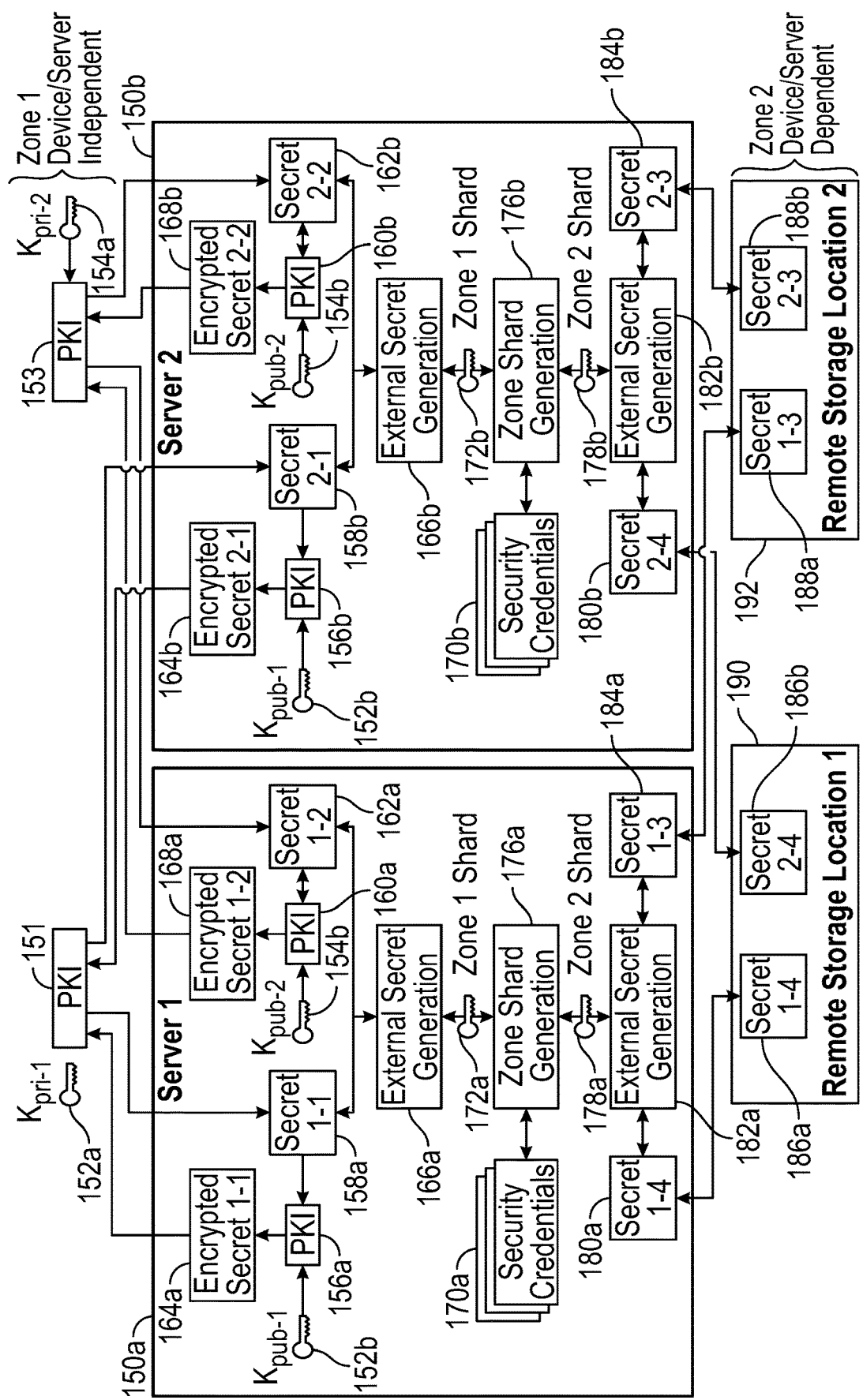
FIG. 3 is an illustration of systems for generating and recovering a distributed secret for a security credential, according to embodiments of the present disclosure.

FIG. 3 is an illustration of systems for generating and recovering a distributed secret for a security credential, according to embodiments of the present disclosure. FIG. 3 illustrates two distribution mechanisms. One such distribution may be performed with public key infrastructure (PKI), and another such distribution may be to distribute the secrets to multiple servers. The multiple servers may be in remote storage locations. Shown in FIG. 3 are two zones, one for each of the example distribution mechanisms. Although there are only two zones shown for the sake of clarity, there is no limit to the number, type, and combination of zones that can be implemented.

Illustrated in FIG. 3 are two example servers 150. Each of servers 150 may be implemented in any suitable manner, such as by a blade server, computer, stand-alone machine, virtual machine, or any other suitable electronic device. Servers 150 may each implement, fully or in part, system 100 from FIG. 1 and system 120 from FIG. 2. Two servers, server 1 150A and server 2 150B are shown, though any suitable number and kind of servers may be used.

A set of zone shards may be generated for a given security credential. As a result, multiple shards and multiple secrets derived from each shard may be tied to the original security credential.

Each server 150 may include any suitable number and kind of security credentials 170. Security credentials 170 may be used to create shards by zone shard generation function circuit 176. Zone shard generation function circuit 176 may be implemented in any suitable manner, such as by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. Zone shard generation function circuit 176 may implement, fully or in part, system 100 from FIG. 1 and system 120 from FIG. 2. Zone shard generation function circuit 176 may be configured to generate shards into zones, according to how secrets will be derived from the shard and stored.

For a given security credential from security credentials 170, zone shard generation function circuit 176 may be configured to generate a zone 1 shard 172 and a zone 2 shard 178. These may be created using threshold encryption $N=T_N$ function circuit 104. Next, secrets from the respective shards may be created and distributed. Once all zone shards have been generated, security credential 170 may be completely and securely destroyed.

Zone 1 shard 172 may be processed by an external secret generation function circuit 166 to create multiple secrets 158, 162. Although only 2 secrets 158, 162 are shown for clarity, any suitable number of secrets may be generated using a threshold encryption X≥T function, such as function circuits 110, 114. Zone 1 shard 172 may be securely destroyed once secrets 158, 162 have been created. Public and private keys may be created through any suitable process. Public keys 152B, 154B may be stored on servers 150. Public key 152B may be used by a PKI function circuit 156 to create an encrypted secret 164 from secret 158. In server 1 150A, this may refer to generating encrypted secret 1-1 164A from secret 1-1 158A. This may be performed by PKI function circuit 156A using public key 152B. In server 2 150B, this may refer to generating encrypted secret 2-1 164B from secret 2-1 158B. This may be performed by PKI function circuit 156B using public key 152B. Notably, the same public key—public key 152B—may be used by both server 1 150A and server 2 150B to encrypt secrets 158 therein to create encrypted secrets 164. Once encrypted secret 164 has been created, secret 158 may be securely destroyed. Encrypted secret 164 may be stored locally.

Similarly, public key 154B may be used by a PKI function circuit 160 to create an encrypted secret 2 168 from secret 2 162. Once encrypted secret 2 168 has been created, secret 2 162 may be destroyed. In server 1 150A, this may refer to generating encrypted secret 1-2 168A from secret 1-2 162A, performed by PKI function circuit 160A using public key 154B. In server 2 150B, this may refer to generating encrypted secret 2-2 168B from secret 2-2 162B, performed by PKI function circuit 160B using public key 154B. Again, the same public key public key 154B—may be used by both server 1 150A and server 2 150B to encrypt secrets 162 therein to create encrypted secrets 168.

PKI function circuits 156, 160 may be implemented in any suitable manner, such as by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

Zone 2 shard 178 may be processed by an external secret generation function circuit 182. External secret generation function circuit 182 may be implemented in any suitable manner, such as by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. External secret generation function circuit 182 may be an implementation of function circuit 114. External secret generation function circuit 182 may be configured to generate multiple secrets, such as secret 3 184 and secret 4 180. Although generation of only two such secrets is shown for clarity, multiple secrets can be generated using a threshold encryption $X \geq T_X$ function such as function circuits 110, 114. Zone 2 shard 178 may be securely deleted once secret 3 184 and secret 4 180 have been created.

Secret 3 184 and secret 4 180 may be securely transmitted to remote storage locations. In one embodiment, secret 3 184 and secret 4 180 may be transmitted and stored on different remote storage locations. For example, secret 1-4 180A may be securely transmitted and stored on remote storage location 1 190, at location 186A. Secret 1-3 184A may be securely transmitted and stored on remote storage location 2 192, at location 188A. Once securely stored, secret 3 184 and secret 4 180 may be securely destroyed.

Servers 150 may reconstitute security credentials through use of keys to first reconstitute the zone shards. At least two external keys may be required to reconstitute zone shards 172, 178 in FIG. 3. However, any number of keys might be required to reconstitute a given shard, depending upon the encryption scheme.

Servers 150 may reconstitute zone 1 shard 172. Encrypted secret 164 may be securely transmitted to an external PKI function circuit 151. Private key 152A may be used by external PKI function circuit 151 to create secret 158 from encrypted secret 164. External PKI function circuit 151 may securely transmit secret 158 back to server 150. External PKI function circuit 151 might require a decryption algorithm corresponding to the encryption function used on server 150. For example, external PKI function circuit 151 may perform decryption corresponding to the encryption that was performed by PKI function circuit 156. Similarly, encrypted secret 168 may be securely transmitted to external PKI function circuit 153. Private key 154A may be used by external PKI function circuit 153 to create secret 162 from encrypted secret 168 and securely transmit it back to server 150. External PKI function circuit 153 might require a decryption algorithm corresponding to the encryption function used on server 150. For example, external PKI function circuit 153 may perform decryption corresponding to the encryption that was performed by PKI function circuit 160. Function circuits 151, 153 may be implemented in any suitable manner, such as by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices.

Subsequently, external secret generation function circuit 166 may use secret 158 and secret 162 to recreate zone 1 shard 172. Secret 158 and secret 162 may be securely destroyed once zone 1 shard 172 has been recreated.

Servers 150 may reconstitute zone shard 2 178. Server 150 may retrieve secret 4 186 from remote storage location 1 190, and may store it locally. Secret 3 188 may be retrieved from remote storage location 2 192 and stored locally. Local secret 4 180 and local secret 3 184 may be used together by external secret generation function circuit 182 to generate zone 2 shard 178. Local secret 4 180 and local secret 3 184 may be securely destroyed once zone 2 shard 178 has been created.

Servers 150 may then reconstitute the original security credential 170. Zone 1 shard 172 and zone 2 shard 178 may be used together by zone shard generation function circuit 176 to reconstitute a corresponding security credential 170. Once security credential 170 has been created, zone 1 shard 172 and zone 2 shard 178 may be securely destroyed.

In FIG. 3, it can be seen that there are two zone class types. In one zone the secrets are stored externally to server 150. In the second zone, the external secrets are stored locally in an encrypted state in sever 150. In the second zone, the same public keys 152B, 154B may be each used on each server 150A, 150B to encrypt secrets. Consequently, private keys 152A, 154A can be used to decrypt secrets for either server 150A, 150B. Therefore, in this example, the private key is independent of the server and tied to the owner of that key. However, both private keys 152A, 154A may be required to regenerate zone 1 shard 172 and, consequently, a security credential 170. A zone with this property may be referenced as a device-independent zone or server-independent zone.

However, secrets 1-4 186A and 2-4 186B on remote storage location 1 190 and secrets 1-3 188A and 2-3 188B on remote storage location 2 192 must be provided to their respective server, 150A, 150B. Secret 2-4 186B from remote storage location 1 190 cannot be used on server 150A. Moreover, secret 2-3 188B from remote storage location 2 192 cannot be used on Server 150A. Thus, a zone with this property may be referenced as a device-dependent zone or server-dependent zone.

Thus, in one embodiment, successful reconstitution of security credentials requires one or more server-independent keys and one or more server-dependent secrets to be provided to reconstitute the security credential. The server-independent keys can be realized as physical devices, such as a hardware dongle, smart card, or mobile device app. Thus, a remote credential (a server-independent physical device, for example) and a local credential (a server-dependent credential stored on the remotely located server, for example) may be required to reconstitute the security credentials. This may significantly improve the security of the system when compared to simply storing security credentials 170 themselves. Although server-dependent and server-independent external keys are shown in different zones, it is possible to mix both in the same zone. Doing so may alter the security level of the solution.

Server-independent secrets may allow the owner of the private key to decrypt a locally stored encrypted secret on a server that used the corresponding public key to encrypt it. For example, in FIG. 3, owners of private keys 152A, 154A can successfully recreate zone 1 shard on either server 150A, 150B. However, such owners could not regenerate security credential 170A or security credential 170B unless the corresponding zone 2 shard is also recreated. Zone 2 shard recreation may require server-dependent authorization. An example of how this may be used is as follows. A server 150 may be hosted in a location not operated by the owner of server 150. Private/public key pairs may be realized as a smart card for the private keys. One smart card may be presented to the server owner and a different smart card presented to the location manager. The public keys are used on each server to create locally stored encrypted secrets. These servers 150 may require the local application of the smart card of the owner and that of the location manager to decrypt them. Further, server-dependent secrets are created by the server owner system administrator and also by the location system administrator. These secrets are stored externally. To reconstitute security credential 170, the system administrators must restore the zone 2 shard on a specific server 150. The smart card users can then restore the zone 1 shard on that same server 150. Neither the owners of the smart cards, who must be physically present to use them, or the system administrators working remotely, can reconstitute a security credential on their own. Additionally, the smart card owners need only carry one smart card to participate in the process since that card can decrypt secrets on any server that used corresponding public key to encrypt the secrets. The system prevents remote reconstitution of security credentials without the participation of a local smart card holder. That is, no unattended access is allowed. Similarly, local smart card users cannot reconstitute a security credential without the participation of the system administrators. That is, no unsupervised access might be allowed.

Figure 4:
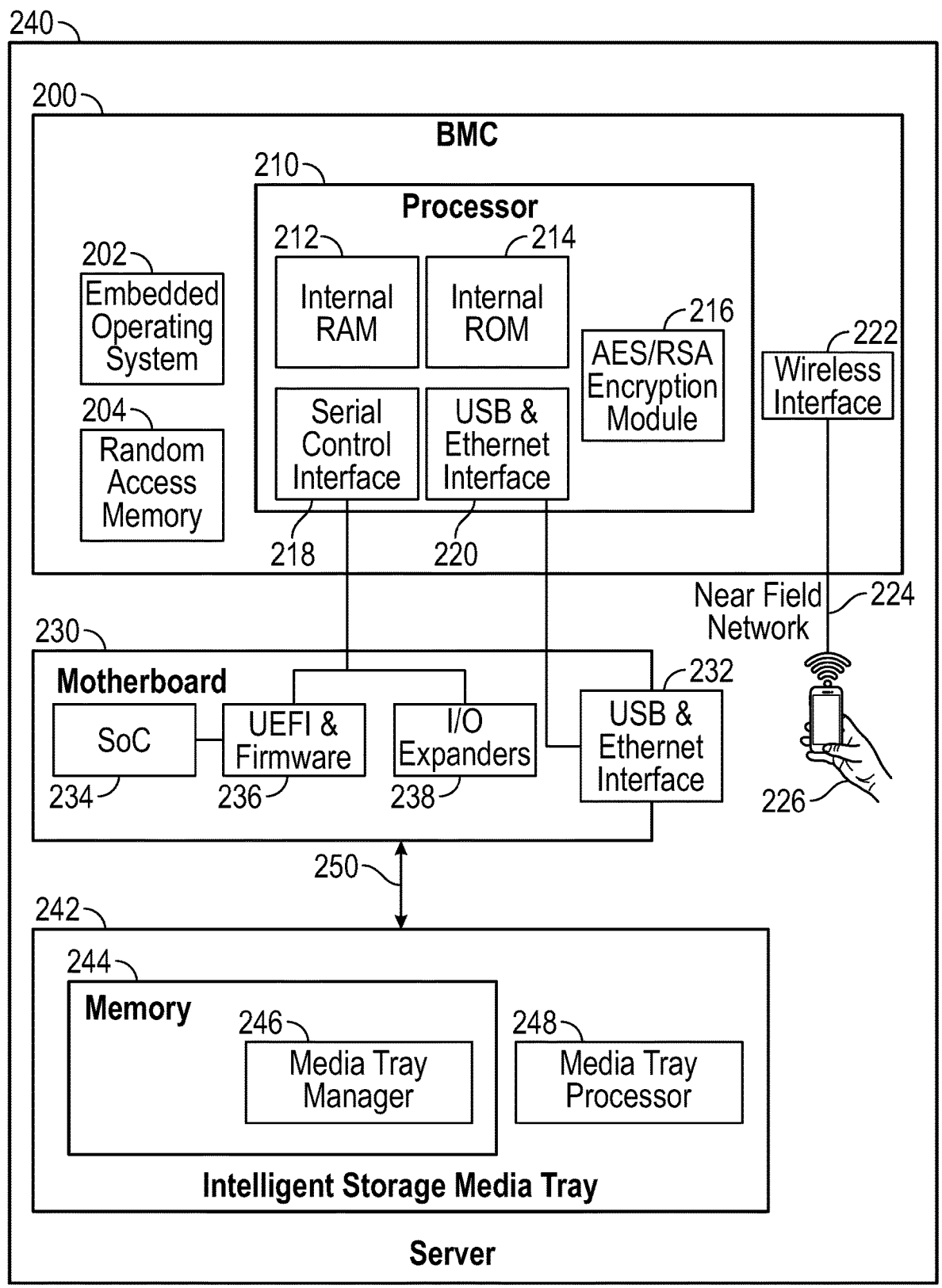
FIG. 4 is an illustration of an example system using of an NFC card for generating and recovering a distributed secret for a security credential, according to embodiments of the present disclosure.

FIG. 4 represents a specific embodiment of the implementation of a smart card solution using Near Field Communications (NFC).

A server 240 can be implemented using two independent processing systems. Server 240 may be an implementation of server 150. A baseboard motherboard controller (BMC) 200 may provide standard BMC functions, such as a server management interface. BMC 200 may be a standalone system and may include a processor 210, embedded operating system 202, random access memory (RAM) 204, and wireless interface 222. Wireless interface 222 may be implemented by analog circuitry, digital circuitry, control logic, instructions for execution by a processor, digital logic circuits programmed through hardware description language, ASIC, FPGA, PLD, or any suitable combination thereof, or any other suitable mechanism, whether in a unitary device or spread over several devices. Wireless interface 222 may be configured to provide a near field network, using NFC, to communicate with an NFC-enabled smart card 226. Motherboard 230 may provide the main processing for server 240 using a System-on-A-Chip (SoC) 234, I/O expanders 238, and UEFI and firmware 236. BMC 200 may communicate to UEFI and firmware 236 via a serial control interface 218 and I/O expanders 238.

BMC processor 210 may have its own AES/RSA encryption function circuit 216 to provide cryptographic functions independently of motherboard 230. Using AES/RSA encryption function circuit 216, together with internal read-only memory (ROM) 214 and internal RAM 212, processor 210 may provide asymmetric encryption, or PKI, functions. Consequently, processor 210 can, for example, implement PKI function circuits 156, 160 for each server 150. Processor 210 may store public keys 152B, 154B locally. Processor 210 may create and store encrypted secrets 164, 168. BMC 200, using processor 210 and wireless interface 222 can then securely transmit a copy of encrypted secrets 164, 168 to the NFC-enabled smart card 226 using near field network 224. NFC-enabled smart card 226 may contain a private key 152 and decrypt encrypted secret 164, 168 transmit it back to BMC 200 via near field network 224. Secret 158, 162 can then be used to compute zone 1 shard 172. Processor 210 can also provide external secret generation 166 function circuit to create secrets 158, 162 from the zone 1 shard 172. Conversely, processor 210 can also provide external secret generation function circuit 166 to reconstitute zone 1 shard 172 from secrets 158, 162 reconstituted using NFC-enabled Smart Card 226.

Using the above embodiment may provide two distinct advantages. First, the owner of the public key might be required to be physically close—within a few inches—of wireless interface 222, providing a physical layer of security. Second, generation of secrets 158, 162 and creation and storage of encrypted secrets 164, 168 may be isolated from motherboard SoC 234. Motherboard SoC 234 can be used to process the server-dependent secrets and BMC 200 can process the server-independent secrets. This isolation may further prevent a remote administrator from accessing server-independent secrets, or a local smart card owner from access server-dependent secrets, thus preventing unattended and unsupervised access.

An instance of 240 may also include or be communicatively coupled to an intelligent storage media tray 242, according to embodiments of the present disclosure. Tray 242 may be implemented in any suitable manner. Tray 242 may include caddies, bins, receptacles, or any other suitable mechanism (not shown) for holding storage devices (not shown) and providing communication interfaces for such storage devices. Moreover, tray 242 may be configured to provide any suitable data processing function for data to or from storage devices (not shown) therein, such as video transcoding, encryption, or decryption. As discussed further below, tray 242 may include its own processor or digital logic. As discussed further below, any suitable number and kind of storage devices may be hosted by tray 242, whether a same or different kinds of storage devices on a given tray, and storage devices may be implemented by, for example, electromechanical storage such as hard disks, solid state storage such as flash memory, other types of storage media, or combinations of these. Tray 242 may reside within any suitable instance of a server 240, which may include any suitable number or kind of trays 242.

Each tray 242 may include a memory 244 communicatively coupled to a processor, such as a media tray processor 248. Tray 242 may include a media tray manager 246 which may be implemented in any suitable manner, such as by analog circuitry, digital circuitry, control logic, instructions for execution by a processor such as media tray processor 248, digital logic circuits programmed through hardware description language, ASICs, FPGA, PLDs, or any suitable combination thereof, whether in a unitary device or spread over several devices. Media tray manager 246 may be configured to provide the tray-side functionality described in more detail below.

Tray 242 may be implemented within an example server 240. Moreover, tray 242 may be implemented within or communicatively coupled to a server internal unit such as processor 210 of BMC 200 or to a processor of motherboard 230, such as SoC 234. The server internal unit may include a motherboard or other mechanisms for attaching and communicating with various components such as multiple instances of tray 242, or to other devices through any suitable protocol, such as wireless interface 222 or USB and Ethernet interface 232. Tray 242 may be communicatively coupled to these other elements through bus 250.

Figure 5:
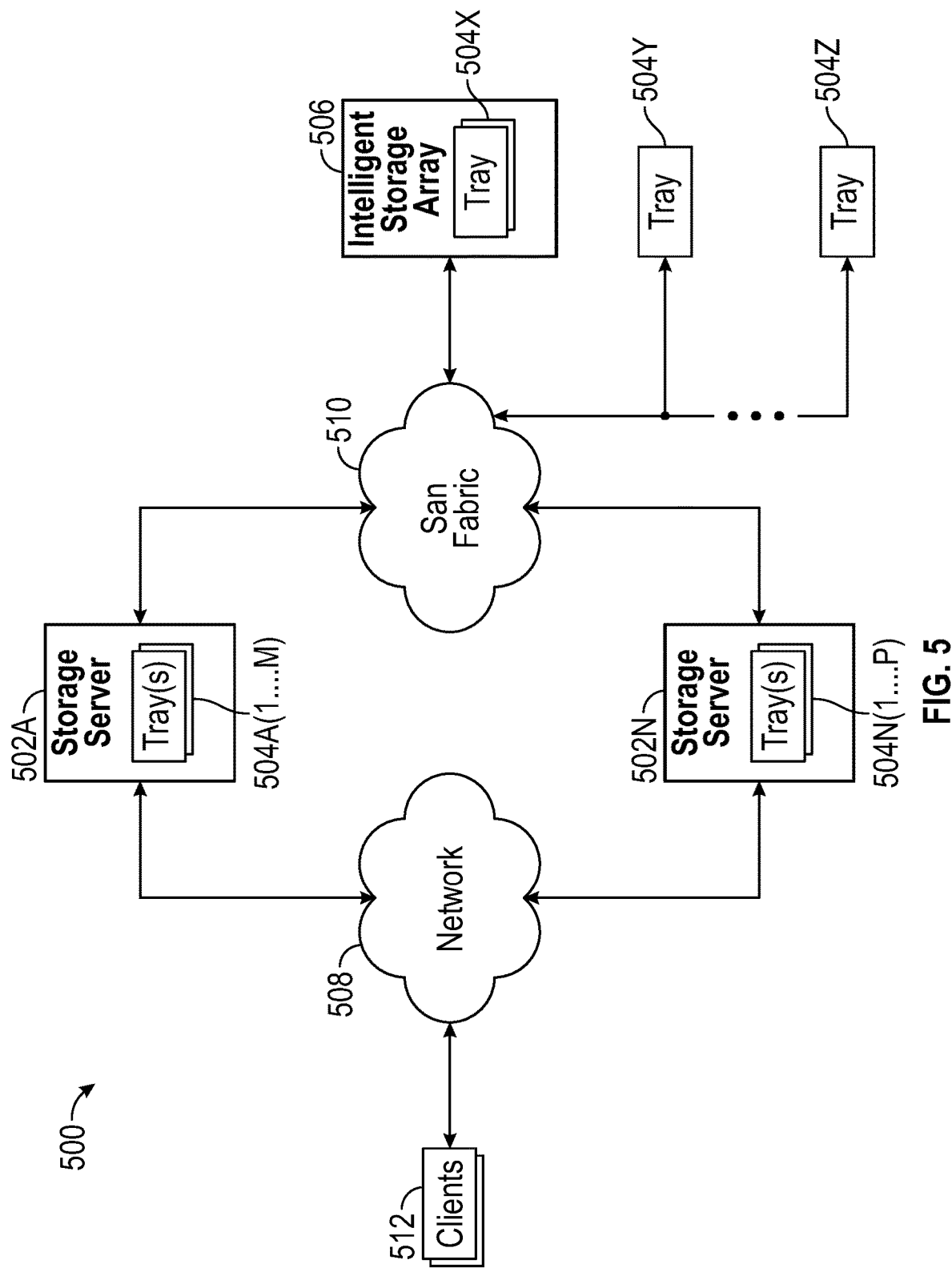
FIG. 5 illustrates an exemplary distributed storage architecture or network in which various instances of an intelligent storage media tray can be implemented, according to embodiments of the present disclosure.

As discussed above, the functions, operations, circuits, and other elements of the servers 100, 130, 150 of FIGS. 1-3 may be implemented in any suitable manner, such as by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. In particular, these may be implemented by any suitable components of a processor, a function, library call, subroutine, shared library, software as a service, analog circuitry, digital circuitry, control logic, digital logic circuits programmed through hardware description language, ASIC, FPGA, or PLD of BMC 240, motherboard 230, or tray 242, or any combination thereof. For example, these may be implemented by processor 210 of BMC, a processor of motherboard 230 such as SoC 234, or by media tray processor 248, or execution of instructions therein. FIG. 5 illustrates an exemplary distributed storage architecture 500 or network in which various instances of an intelligent storage media tray 504 can be implemented, according to embodiments of the present disclosure.

Tray 504 may be implemented in any suitable manner. Tray 504 may be an implementation of, or may be implemented by, tray 242. Tray 504 may include caddies, bins, receptacles, or any other suitable mechanism (not shown) for holding storage devices (not shown) and providing communication interfaces for such storage devices. Moreover, tray 104 may be configured to provide any suitable data processing function for data to or from storage devices therein, such as video transcoding, encryption, or decryption. As discussed further below, tray 504 may include its own processor or digital logic. As discussed further below, any suitable number and kind of storage devices may be hosted by tray 504, whether a same or different kinds of storage devices on a given tray, and storage devices may be implemented by, for example, electromechanical storage such as hard disks, solid state storage such as flash memory, other types of storage media, or combinations of these.

Tray 504 may reside in any suitable portion of distributed storage architecture 500. Distributed storage architecture 500 may include any suitable number and kind of storage servers 502. Servers 502 may be communicatively coupled via a network 508. Each of servers 502 may include a plurality of trays 504 therein. It is to be understood that one or more trays 504 can reside on more, fewer or different storage servers 502 or other computing devices as desired. For example, trays 504 may also reside on intelligent storage arrays 506 or in a stand-alone configuration, connected by a storage area network (SAN) fabric 510. Although a SAN fabric is shown as an example, any suitable connectivity protocol, such as iSCSI, may be used. It is to be understood that the number of intelligent storage media trays 504 residing on any given portion of architecture 500 is a variable design parameter, and different numbers of intelligent storage media trays 504 can be housed by different computing devices in different embodiments as desired. Any suitable number of clients 512 may access trays 504 through network 508 or SAN fabric 510. Trays 504 may be housed in the form of rack mounted computing devices, in a datacenter comprising many large storage racks each housing a dozen or more storage servers 502, trays 504 each housing multiple storage devices. It is also to be understood that distributed storage architecture 500 can be physically instantiated across multiple data centers in multiple locations, including different cities or continents.

Servers 502, intelligent storage arrays 504, and clients 512 may be implemented in any suitable manner, including by a server, computer, blade, or any other suitable electronic device. Servers 502, clients 512, and intelligent storage array 506 may be implementations of any of servers or systems 100, 130, 150, 240, discussed above. Moreover, in some embodiments, trays 504 may be implementations of any of servers or systems 100, 130, 150, 240. Servers 502, arrays 504, and clients 512 may be implementations of or implemented by server 240.

Figure 6:
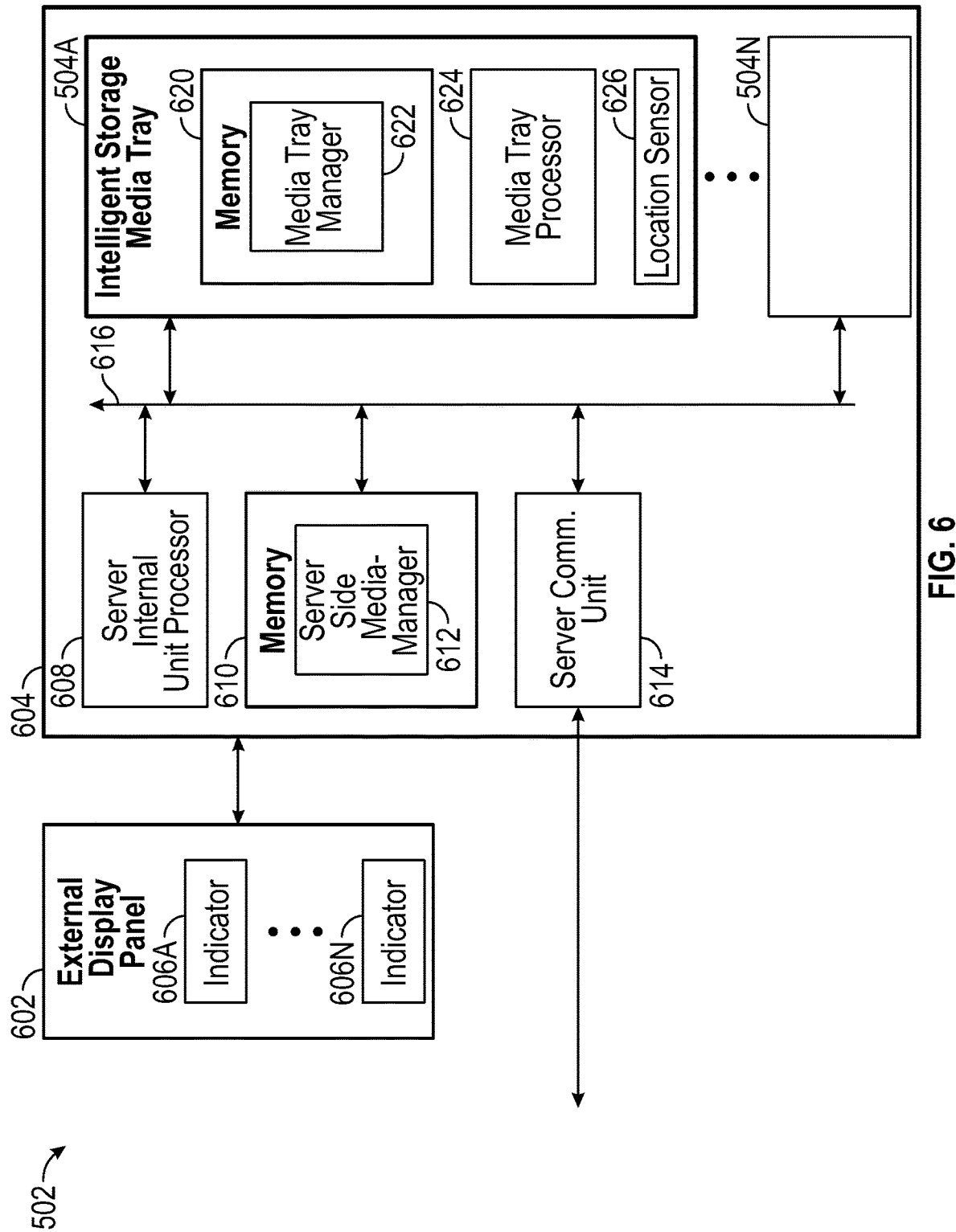
FIG. 6 illustrates further details of possible implementations of systems in which a tray may be implemented, such as an instance of a server, according to embodiments of the present disclosure.

FIG. 6 illustrates further details of possible implementations of systems in which tray 504 may be implemented, such as an instance of server 502, according to embodiments of the present disclosure. As shown, each tray 504 may include a memory 620 communicatively coupled to a processor, such as media tray processor 624. Tray 504 may include a media tray manager 622 which may be implemented in any suitable manner, such as by analog circuitry, digital circuitry, control logic, instructions for execution by a processor such as media tray processor 624, digital logic circuits programmed through hardware description language, ASICs, FPGA, PLDs, or any suitable combination thereof, whether in a unitary device or spread over several devices. Media tray manager 622 may be configured to provide the tray-side functionality described in more detail below.

As shown in FIG. 6, tray 504 may be implemented within an example server 502. Moreover, tray 504 may be implemented within or communicatively coupled to a server internal unit 604. Server internal unit 604 may include a motherboard or other mechanisms for attaching and communicating with various components such as multiple instances of tray 505. These may be communicatively coupled with a bus 616 of any suitable communication protocol. Sever internal unit 604 may be communicatively coupled to an external display panel 602, which may include any suitable number and kind of indicators 602. Additionally, server internal unit 604 may include a server internal unit processor 608, memory 610, and other components. In one embodiment, a server-side media manager (SMM) 612 can reside in memory 610 and be executed by processor 608 to facilitate the server-side functionality described herein.

Server internal unit processor 608 may be implemented by, or may be an implementation of, processor 210 of BMC 200 or a processor of motherboard 230 such as SoC 234. Memory 610 may be implemented by, or may be an implementation of, memories 202, 204, 212, 214 of BMC 200 or memory (not shown) of motherboard 230. SSMM 612 may be implemented by, such as by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. These may include instructions or circuitry on one or more of BMC 200 or motherboard 230.

In one embodiment, at least one of indicators 606 may be a fault indicator. This fault indicator may be activated by SSMM 612 to visually indicate that a storage device (not shown) housed by a given tray 504 within server 502 verified for removal. A given storage device may be verified for removal when SSMM 612 receives a control signal that a specific storage device housed in a specific tray housed by a given server or other suitable computing device has failed, is expected to fail, is to be removed, upgraded, is in any other way to no longer be used, or is in any way inoperable. The control signal may reflect a determination by any suitable entity that such a storage device is verified to be removed. The control signal may be initiated, for example, by a user of the system, a technician activating an actuating member on a tray, a disk monitoring circuit or software, diagnostic software, or by a storage device itself. Moreover, the control signal may be generated by motherboard 230 or BMC 200 and provided to SSMM 612, or generated on tray 242 and provided to SSMM 612 over bus 250.

Further, another of indicators 606 may be activated to visually indicate the operational status of each or a group of storage devices within server 502. It is to be understood that external display panel 602, in some embodiments, is situated on a casing on the exterior of server 502. When situated on the casing of server 502, external display panel 602 can provide visual cues to a user (e.g., a datacenter administrator, or technician or the like), to readily identify a specific server 502 containing one or more storage devices verified for removal that may require attention. As described in more detail below, indicators 606 can be implemented in the form of light emitting diodes ("LEDs"), light pipes or other light generating hardware. Media tray manager 622 may transmit a control signal to SSMM 612 when a storage device (not shown) connected thereto to tray 504 is verified for removal. SSMM 612 may then activate indicators 606 as appropriate.

Server 502 may include a server communications unit 614 to send or receive information according to any suitable protocol. Server communications unit 614 may be implemented by or may be an implementation of, for example, wireless interface 222 or USB and Ethernet interface 232.

Each tray 504 may, in some embodiments, contain a location sensor 626. Locations sensors 626 may be implemented in any suitable manner, such as by a GPS receiver system, wireless phone receiver, or inertial position sensor. In the case of GPS and cell phone receivers, location sensors 626 may be configured to determine a specific location. This may arise from the triangulation of external radio signals, satellite stations, and terrestrial stations. In the case of inertial position sensors, location sensors 626 may be configured to detect the inertial change arising from movement of the server in which trays 504 are located. Such location sensors 626 might not provide an absolute position, but do not require an external signal to operate. Location sensors 626 can be configured to periodically determine the physical position of trays 504. Location sensors 626 can use a rechargeable modular power unit, discussed below, to ensure physical location can be detected even if the system power is removed. This may allow the detection of a change in physical position if any tray 504 is removed from a server, or if the server itself is disconnected from a power source and physically moved.

Figure 7:
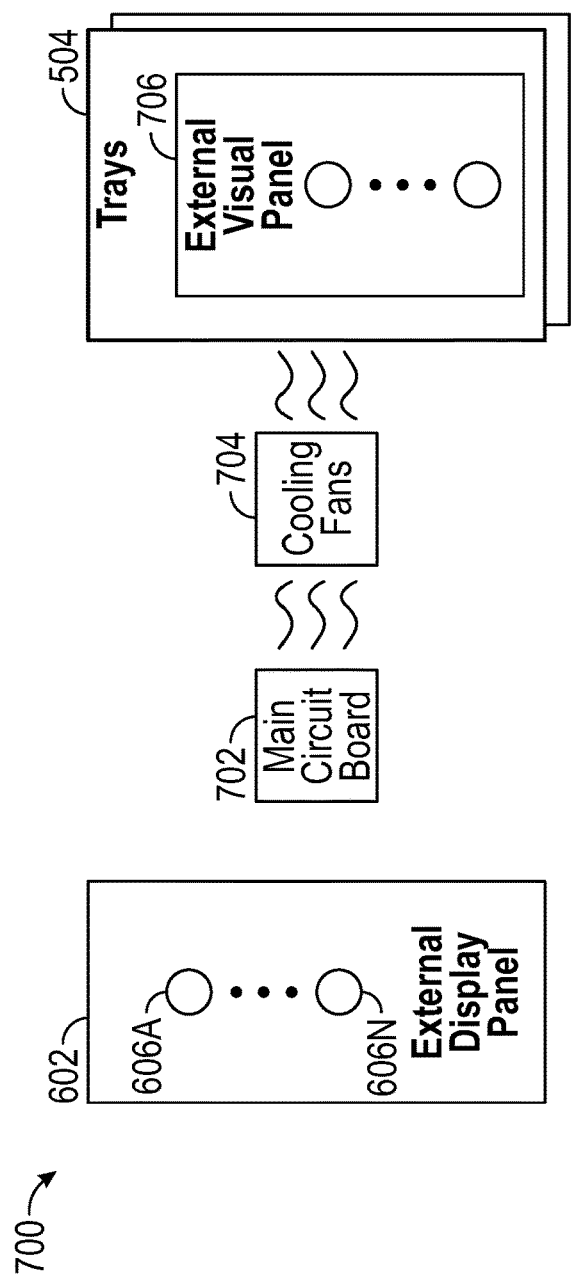
FIG. 7 illustrates further details of possible implementations of systems in which a tray may be implemented, such as an instance of a server and the use of indicators specific to a tray and indicators general to a server, according to embodiments of the present disclosure.

FIG. 7 illustrates further details of possible implementations of systems in which tray 504 may be implemented, such as an instance of a server 700 and the use of indicators specific to tray 504 and indicators general to server 700, according to embodiments of the present disclosure. Server 700 may be an implementation of any of servers or systems 100, 130, 150, 240, 502, 506, 512 described above. Shown in FIG. 7 is an instance of external display panel 602 and indicators 606 therein. Moreover, server 700 may include any suitable number of trays 504.

At least one indicator of indicators 606 may be the fault indicator of the system or server described above, which is activated when 612 receives a signal from a tray 504 indicating that at least one storage device housed in the tray 504 is verified for removal. In some embodiments, at least one of indicators 606 may also be activated to visually indicate how many storage devices housed by the specific or any tray 504 is verified for removal.

Each tray 504 may also include one or more external visual indicators in an external visual panel 706. These are described in more detail in the context of FIG. 8. Panel 706 may include indicators that are visible outside server 700. In one embodiment, indicators of panel 706 may be visible when a casing of sever 700 is removed.

Moreover, server 700 may include a main circuit board 702 having modules such as processors, memories, or other components as described above. Cooling fans 704 may be used to dissipate heat across components such as trays 504 or main circuit board 702.

Figure 8:
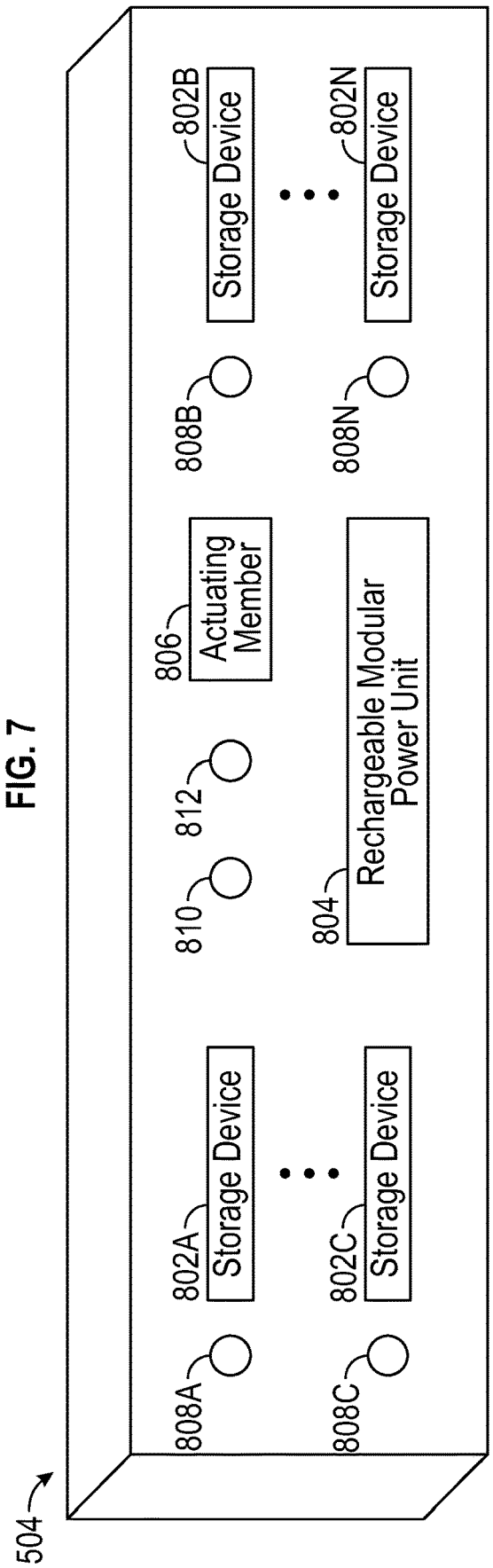
FIG. 8 illustrates further details of implementations of a tray, according to embodiments of the present disclosure.

FIG. 8 illustrates further details of implementations of tray 504, according to embodiments of the present disclosure.

A given tray 504 may house any suitable number and kind of storage devices 802. Tray 504 may include an actuating member 806. In one embodiment, actuating member 806 may be a button that can be pressed. In other embodiments, actuating member 806 may be a latch, switch, or toggle. In still other embodiments, actuating member 806 may include an audio detection circuit configured to detect voice commands. A datacenter administrator or technician may actuate actuating member 806 to remove tray 504 from a server to replace an instance of storage device 802 that is failed, inoperable, to be upgraded, or otherwise requires attention from a technician. Such a storage device 802 may be verified for removal. The actuation of actuating member 806 by the user (e.g., the pressing of the button) can activate a first visual indicator 810 on tray 504 indicating that the actuation of the member has registered (e.g., the button press has been detected).

In response to pressing of the button, media tray manager 622 can transmit a signal to SSMM 612 which can programmatically classify all of storage devices 802 housed in the specific instance of tray 504 as being not included in architecture 500. SSMM 612 may transmit a corresponding notification to the other elements of architecture 500 indicating the classification of storage device 802, and upon receipt of an acknowledgment from the other elements of architecture 500, a second visual indicator 812 on tray 504 may be activated, indicating that tray 504 may now be safely decoupled from the server in which it resides. In one embodiment, the first indicator 810 may be in the form of a red or yellow light and the second visual indicator 812 may be in the form of a green light indicating that it is safe to proceed with decoupling tray 504 that houses the instance of storage device 802 that is verified for removal. Indicators 810, 812 may be implementations of external indicators of panel 706.

Other embodiments may use a single indictor to implement indicators 810, 812 by using an LED that changes colors. For instance, when actuating member 806 is actuated, the first visual indicator 810 may show a red or yellow light, which subsequently changes to a green light indicating that it is now safe for the technician to decouple tray 504. It is to be understood that these are just examples, and in other embodiments, visual indicators 810, 812 can be implemented in other ways as desired.

Referring back to FIG. 7, indicators 606 of panel 602 may identify a specific instance of tray 504 that house one or more storage devices 802 that are verified for removal. For example, a datacenter administrator/technician may see an activated instance of indicator 326 and readily ascertain which tray 504 to decouple from its housing server since each indicator 326, when activated, serves as a visual identifier indicating that the corresponding tray 504 contains at least one storage device 802 that is verified for removal. For instance, indicator 606A may correspond to tray 504A, indicator 606B may correspond to tray 504B, etc.

Returning to FIG. 8, tray 504 may include any suitable number and kind of indicators 808 to identify a specific corresponding one of storage devices 802. Storage devices 802 can be coupled to or housed in tray 504 by bays, hardware interfaces, or other mechanisms of the same or different types as desired. Some examples of types of storage devices 802 that may be housed in tray 504 are magnetic storage devices such as hard disks, and solid-state media such as flash disks, although other types of storage media not explicitly mentioned herein are also contemplated.

Indicators 808 may be situated in specific physical proximity to corresponding storage devices 802 housed in tray 504. Each of indicators 808 may be configured to be activated when a corresponding one of storage devices 802 becomes verified for removal. Thus, a specific storage device 802 verified for removal can be identified by noting the activated indicator 808 to which the specific storage device 802 corresponds. In some embodiments, indicators 808 be embedded in a casing of or otherwise coupled to tray 504. For example, indicators 808 may be proximate to the mounting screw or similar hardware of tray 504, proximate to or configured as part of the bay or coupling mechanism of tray 504, such that each storage device 802 housed in tray 504 has a corresponding visual indicator uniquely identifying it based on physical proximity. The exact implementation of the positioning of indicators 808 in physical proximity to their corresponding storage devices 802 may be a variable design parameter. In general, indicators 808 may be positioned in tray 504 so that it is clear to the technician which storage device 802 corresponds to which indicator 808. Indicators 808 may be referred to as internal indicators, in that indicators 808 in various embodiments might be visible only when tray 504 is removed from server 502, and may be covered or not visible when tray 504 is inserted into server 502.

Tray 504 may include a rechargeable modular power unit 804 coupled to or included in tray 504. In one embodiment, rechargeable modular power unit 804 is a modular uninterruptible power supply (UPS) that is coupled to tray 504. In this case, rechargeable modular power unit 804 may be charged when tray 504 is coupled to its server. Because of this charging, rechargeable modular power unit 804 may provide an independent power source so that indicators 808, 810, 812 may persist in displaying storage device 802 operational status after decoupling the specific tray 504 from its server. In one embodiment, rechargeable modular power unit 804 may power other circuitry, such as memory or processors of tray 504.

Furthermore, in some embodiments SSMM 612 or media tray manager 622 may provide power supply management. For example, SSMM 612 or media tray manager 622 may sequentially power up or power down individual storage devices 802 housed within tray 504. This ensures that in-rush or power up current can be controlled so as not to overwhelm the power supply to the server to facilitate the reliability of the server. In other embodiments, the sequential powering allows an individual storage device 802 to be held in a completely "off" state where no power is applied to the individual storage device 802 in question. This allows the server to power up the individual storage device 802 as needed to either grow the size of the available storage of the server, or replace a storage device 802 verified for removal in the server to keep the storage capacity of the server static. In further embodiments, this sequential powering up and powering down of individual storage devices 802 may dynamically remove power individually from storage device 802 verified for removal to prevent the storage device 802 verified for removal from drawing power from the server unnecessarily. Moreover, media tray manager 622 may provide power supply management for the operation of indicators 808, 810, 812, as well as any other suitable indicators. The intensity, duration, periodicity, color, or other operating parameters of indicators 808, 810, 812 may be adjusted depending upon whether or not tray 504 is disconnected from server 502 or connected to server 502, and depending upon a battery voltage level of a power supply of tray 504.

Indicators 808, 810, 812 may be implemented in any suitable manner, such as with LEDs, light pipes, or other forms of light generating hardware as desired.

It is to be understood that although SSMM 612 and media tray manager 622 are illustrated as single entities, these components represent collections of functionalities, which can be instantiated as a single or multiple modules as desired. It is to be understood that modules of SSMM 612 and media tray manager 622 can be instantiated (for example as object code or executable images) within the system memory (e.g., RAM, ROM, flash memory) of a computing device, such that when the processor of the computer system processes a module, the computing device executes the associated functionality. These modules may also be instantiated as control logic, hardware, firmware, or any combination of software, hardware and firmware. As used herein, the terms "computer system," "computer," "client," "client computer," "server," "server computer" and "computing device" mean one or more computers configured and/or programmed to execute the described functionality. Additionally, program code to implement the functionalities of SSMM 612 and media tray manager 622 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Figure 9:
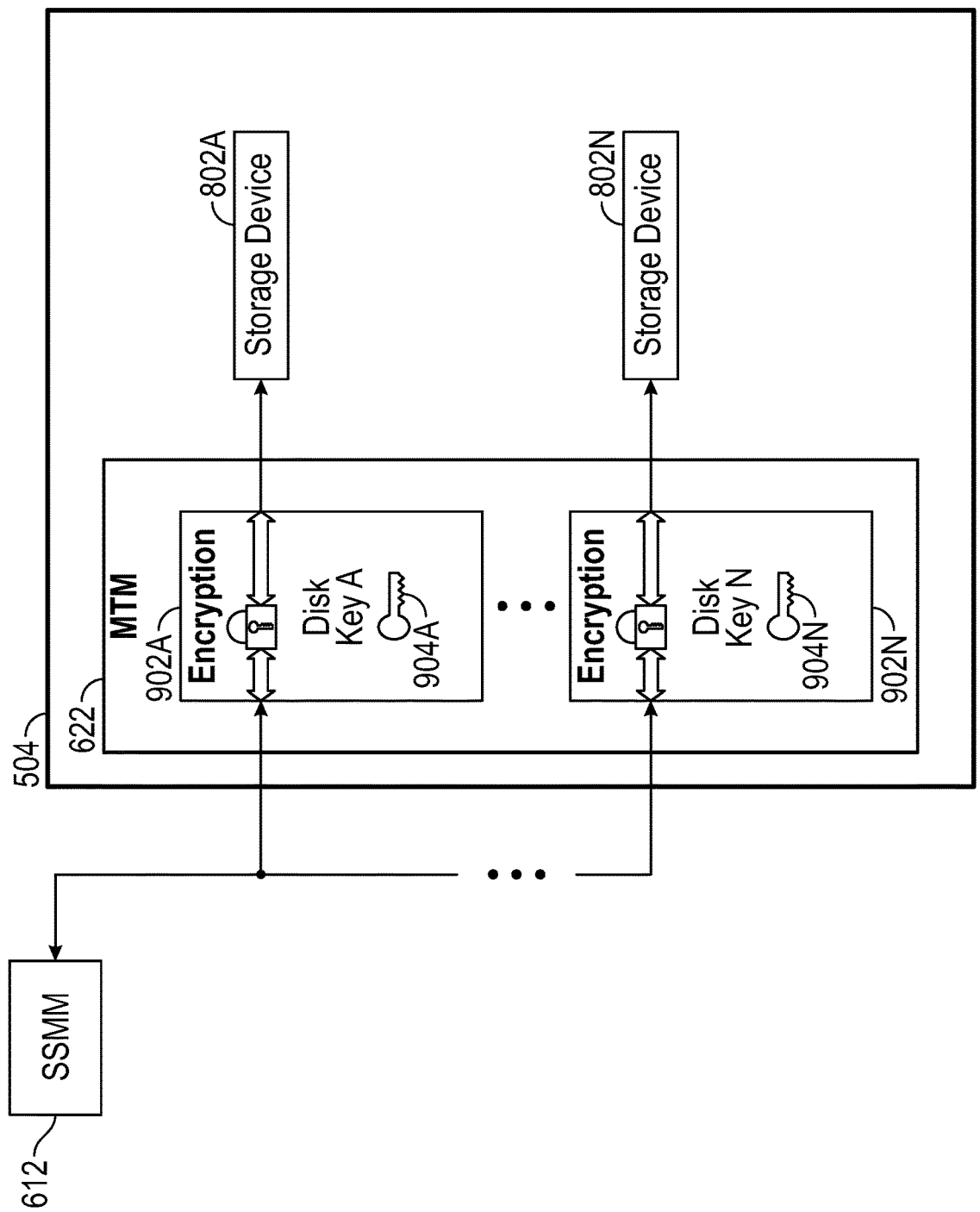
FIG. 9 is an illustration of an example of symmetric data encryption for storage devices, according to embodiments of the present disclosure.

FIG. 9 is an illustration of an example of symmetric data encryption for storage devices, according to embodiments of the present disclosure. SDS data may be exchanged between SSMM 612 and media tray manager 622. Media tray manager 322 may contain an encryption module 902 for each storage device 802 included in or communicatively coupled to tray 504. Each encryption module 902 may have its own unique disk key 904. Each of these disk keys 904 may be individually generated by media tray manager 622. This may allow the SDS data from SSMM 612 to be encrypted with disk keys 904 before it is written to the respective storage device 802. The data that is sent from each storage device 802 may be first decrypted with its respective disk key 904 before being sent to SSMM 612. In addition to the advantage of data protection, the encryption may also useful when the instance of storage device 802 is decommissioned. A challenge when decommissioning storage device 802 may be that the data must not be recoverable once an individual media of storage device 802 has been permanently removed from tray 504. One option may be to securely overwrite the data on the media. This can take a considerable amount of time. A second option may be to securely delete all copies of the encryption key, such as disk keys 904. However, as a precaution, backup copies may be made of disk keys 904 and kept in a separate location from the media. In one embodiment, a process may be employed to ensure that all keys are destroyed. A second challenge may be to ensure a given storage device 802 has had its associated disk key 904 destroyed before storage device 802 is physically removed from the server.

In one embodiment, instead of storing copies of disk keys 904, disk keys 904 can be securely reconstituted as shown above in FIGS. 1-4. Disk key 904 may be implemented by the security credentials of FIG. 3. In this manner, disk keys 904 may be used to create a set of secrets such that only the original copy of the disk key exists. That is, no externally secured copies may be stored. The secrets can then be used to securely reconstitute a disk key if it is erroneously destroyed. Further, copies of the secrets from the remote storage locations 190 192 and copies of the encrypted secrets 164, 168 can be moved to a new storage server in the case where the original server has become inoperable, thus allowing the disk keys to be reconstituted on the new storage server.

Media tray manager 622 may request a unique identifier token, such as a storage server serial number, from SSMM 612. Media tray processor 624 may store the unique identifier token in non-volatile memory provided by memory 320. This may allow the intelligent storage media tray to retain information regarding the storage server from which it is removed.

Figure 10:
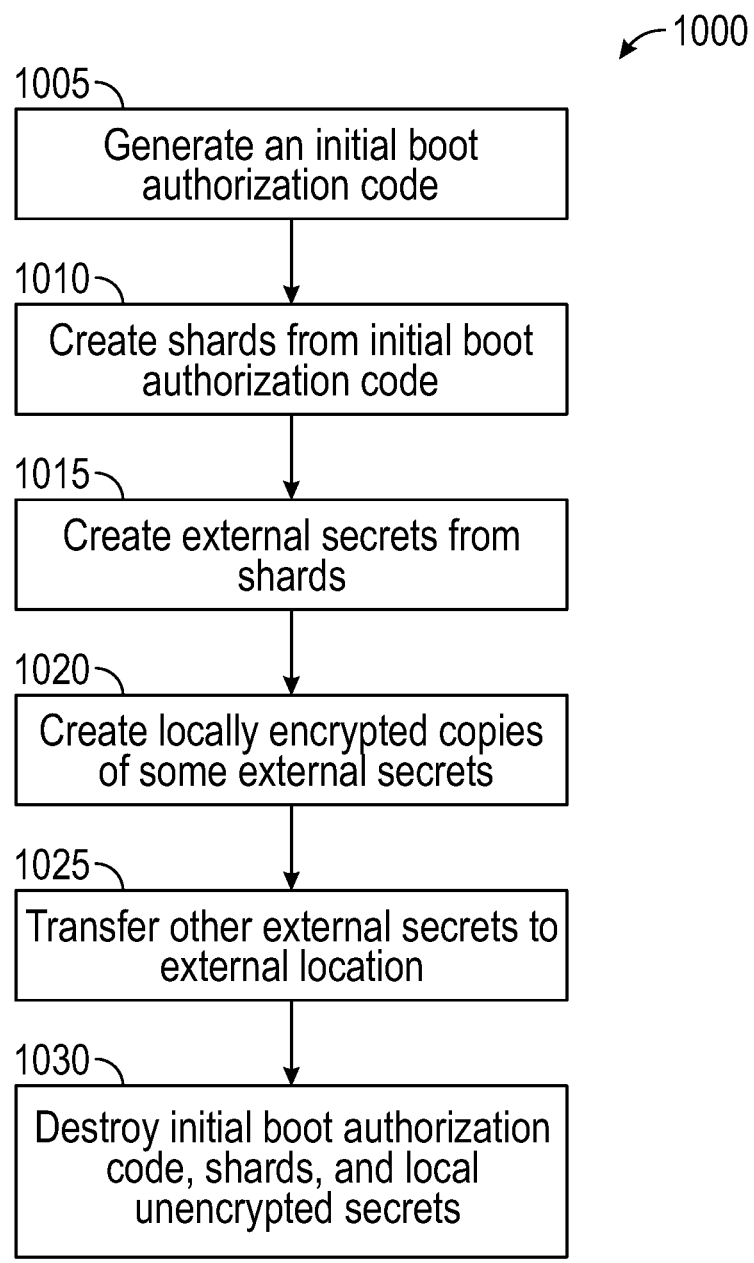
FIG. 10 is an illustration of an example method for generating an initial or reference boot authorization code, according to embodiments of the present disclosure.

FIG. 10 is an illustration of an example method 1000 for generating an initial or reference boot authorization code, according to embodiments of the present disclosure. Method 1000 may be performed by any suitable mechanism, such as by the systems, components, servers, or functions of FIGS. 1-9. Specifically, method 1000 may be performed by a control circuit. The control circuit may be implemented by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. The control circuit may be implemented by, for example, server 100, server 130, server 150, server 240, motherboard 230, SoC 234, BMC 200, processor 210, server 502, server internal unit processor 608, SSMM 612, media tray processor 624, or media tray manager 622. Method 1000 may begin at any suitable step. Steps of method 1000 may be performed in any suitable order, repeated, rearranged, performed recursively, omitted, or performed in parallel.

At 1005, an initial or reference boot authorization code may be generated. Server 502, through operation of the control circuit, may generate the initial or reference boot authorization code. The initial or reference boot authorization code can be obtained directly from components of server 502 or generated from any suitable existing information. For example, the control circuit may use sensitive data, such as boot code, configuration files, operating system components, a checksum, signature, cryptographic product, or other suitable indicator can be generated. Moreover, two or more such elements may be combined. For example, the initial or reference boot authorization code may be a checksum of a combination of boot code or other elements. Boot code may include processor instructions stored for booting server 502 or a portion thereof, when the system is initially powered on. Furthermore, the initial or reference boot authorization code may be derived from other data or identifiers such as MAC addresses of network cards, system Globally Unique Identifier (GUID), or hardware serial numbers. The initial or reference boot authorization code, once determined, may be used to later authenticate operation of server 502 in subsequent boots. This authentication process may authenticate the existence of the underlying components or data that were used to generate the initial or reference boot authorization code. Moreover, multiple instances of the initial or reference boot authorization code may be generated based on various portions of sensitive data. Further, these may be combined to still more intricate authentication codes.

The initial or reference boot authorization code may be stored or used in any suitable manner. In one embodiment, the reference boot authorization code may be stored locally in memory, which may be in an encrypted format. In another embodiment, at 1010, control circuit may initiate a process of sharding and secret generation, using the processes discussed above in FIG. 1, wherein the initial or reference boot authorization code is the security credential 102 to be secured. In other examples, the processes described above in FIGS. 3-4 may be used. The process may begin by generating shards such as shards 108 using a function such as threshold encryption function 104. The original initial or reference boot authorization code may be destroyed.

At 1015, the control circuit may create secrets from the shards, such as creating external secrets 112, 116 from shards 108 using functions such as threshold encryption functions 110, 114. The shards may be destroyed.

At 1020, the control circuit may encrypt some of the secrets and store them locally, using functions such as using asymmetric encryption functions 118 and keys such as public keys 120 to generate secrets such as encrypted external secrets stored locally 122 from secrets 112. These may be stored on, for example, server 502.

At 1025, the control circuit may store some of the secrets externally, such as distributing external secrets 116 over a secure channel to remote locations 124. Once the secrets have been securely copies to remote locations 124, local copies of external secrets 116 may be destroyed.

At 1030, the control circuit may securely destroy any local copies of the authorization code, shards, and locally unencrypted secrets that might not yet be erased by, for example, writing all "0" or all "1" or random values of "0" or "1" t their respective memory locations.

Figure 11:
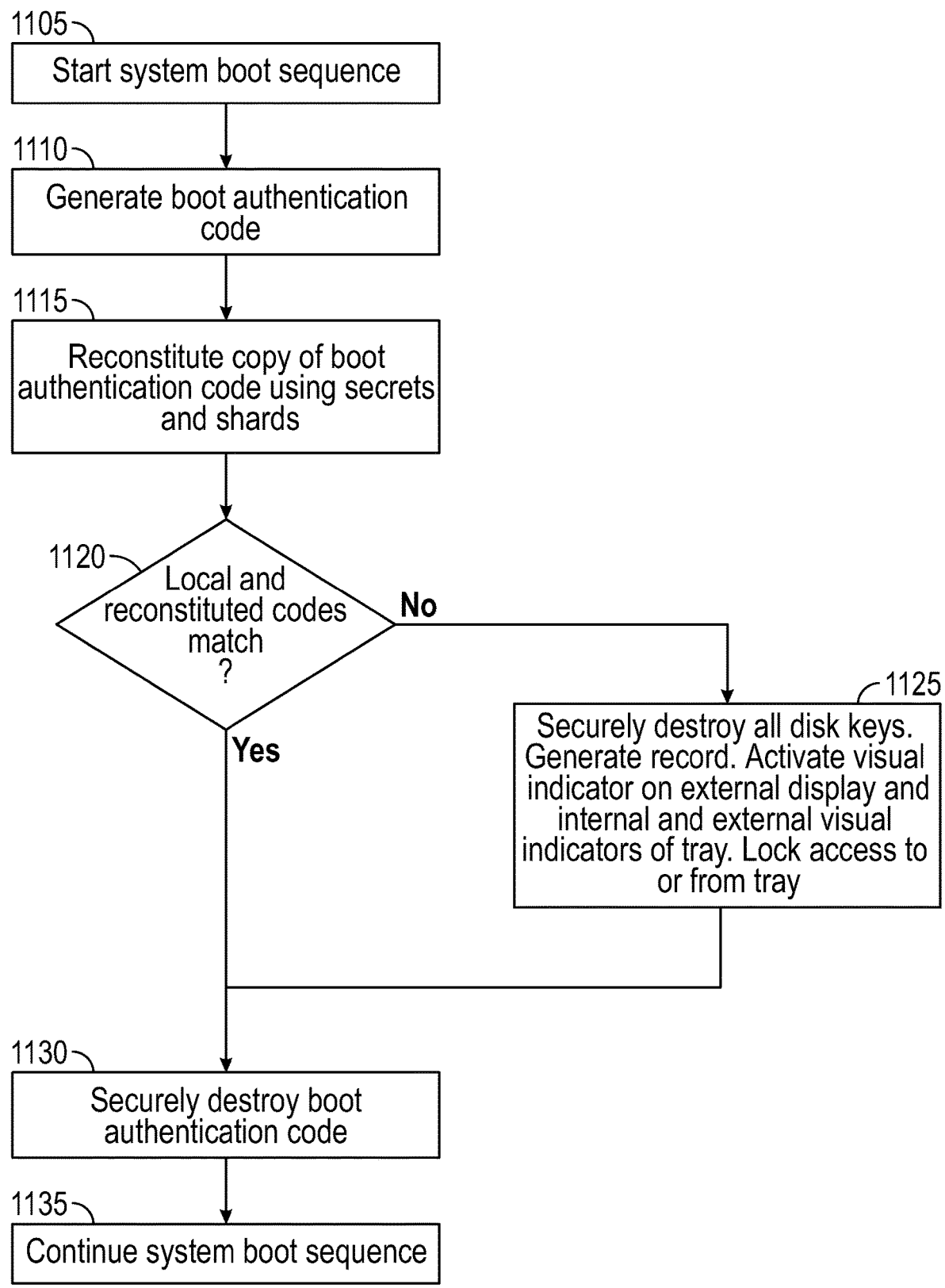
FIG. 11 is an illustration of an example method for secure booting of a server, according to embodiments of the present disclosure.

FIG. 11 is an illustration of an example method 1100 for secure booting of a server, according to embodiments of the present disclosure. Method 1100 may be performed by any suitable mechanism, such as by the systems, components, servers, or functions of FIGS. 1-9. Specifically, method 1100 may be performed by a control circuit. The control circuit may be implemented by instructions in the medium for execution by the processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. The control circuit may be implemented by, for example, server 100, server 130, server 150, server 240, motherboard 230, SoC 234, BMC 200, processor 210, server 502, server internal unit processor 608, SSMM 612, media tray processor 624, or media tray manager 622. Method 1100 may begin at any suitable step. Steps of method 1100 may be performed in any suitable order, repeated, rearranged, performed recursively, omitted, or performed in parallel.

Method 1100 may be used to detect an invalid boot authorization code of a server 502. The invalid code may result in any suitable correction action, such as a cryptographic erasure of encrypted storage media. An unauthenticated boot sequence may also trigger disk key destruction.

At block 1105, server 502 may start a boot sequence. This may be performed by the control circuit.

At block 1110, the control circuit may generate a boot authorization code. The generation of the boot authorization code may follow the same process as was followed in FIG. 10, block 1005, based upon a same set of parameters as were used therein. However, the underlying values represented by such parameters may have changed if, for example, components of server 502 have changed since the initial or reference boot authorization code was generated or, in another example, if server 502 is a different instance of a server than was used to generate the initial or reference boot authorization code.

At block 1115, the control circuit may initiate a process of reconstituting a reference or initial boot authorization code such as the code generated in block 1005, discussed above. In one example, the processes of FIG. 2 may be used, while in other examples, the processes of FIG. 3 or 4 may be used. For example, to reconstitute a security credential 149 embodying the reference or initial boot authorization code, the control circuit may obtain secrets stored remotely, such as secrets 140 stored in remote locations 138. Moreover, the control circuit may decrypt locally stored secrets 132. These secrets may be used with threshold encryption functions 142, 144 to reconstitute shards 146. Shards 146 may be used with threshold encryption function 148 to reconstitute the initial or reference boot authorization code generated in block 1005 of FIG. 10. The initial or reference boot authorization code that has been regenerated may be used as a reference to compare against the presently constituted boot authorization code generated in block 1110. Once the reference or initial boot authorization code has been reconstituted, all secrets and shards may be securely erased. At block 1120, the presently generated boot authorization code from block 1115 may be compared against the initial or reference boot authorization code from block 1110. If they match, method 1100 may proceed to block 1130. Otherwise, method 1100 may proceed to block 1125.

At block 1125, any suitable corrective action may be taken

In one embodiment, storage devices 802 may be erased. The erasure may be performed by a cryptographic erasure. For example, disk keys 904 for all storage devices 802 on all trays 504 may be securely destroyed. This may be performed by, for example, writing all "0" or all "1" or random values of "0" or "1" to the disk key 904 memory locations, destroying all disk keys 904 stored therein.

In one embodiment, a record of the destruction of disk keys 904 may be stored. This may include a list of the specific disk keys 904 that were destroyed. A list of storage devices 802 associated with the destroyed disk keys 904 may be added to the record such that the storage devices 802 can be uniquely identified. This may be done, for example, using a device serial number. The record may also include a unique identifier token as described earlier that may identify the instance of server 502 associated with the instance of tray 504 that includes the deleted storage devices 802. Visual indicators may be updated to reflect a completed cryptographic erasure of storage devices 802 that were associated with the destroyed disk keys 904.

In one embodiment, the control circuit through, for example, SSMM 612 may activate a visual fault indicator 606 on an external display panel 602 such as the external display panel 602 of server 502. Indicator 606 may indicate that server 502 contains a cryptographically erased storage device 802. This may enable a technician in a datacenter to easily identify those storage servers 502 that contain cryptographically erased storage devices 802 by, for example, traversing aisles of a datacenter and identifying activated visual fault indicators 606. This is significant, given there could be thousands of servers 502 in the datacenter.

In one embodiment, the control circuit through, for example, media tray manager 622 may activate an external visual indicator 706 on the specific tray 504 containing the cryptographically erased storage devices 802. Recall that indicator 706 may indicate that the specific tray 504 contains a cryptographically erased storage device 802. This may enable a technician to easily identify specific trays 504 that contain cryptographically erased storage devices 802.

In one embodiment, the control circuit through, for example, media tray manager 622 may activate an internal visual indicator 808 on the specific tray 504 within a specific physical proximity to the cryptographically erased storage device 802.

In one embodiment, prior to removal from server 502, the control circuit through, for example, media tray processor 624 may establish an access lock on tray 504. This lock may prevent and data access to and from tray 504 by any other components of server 502—such as SSMM 612 or server internal unit processor 608—via bus 616.

Method 1100 may proceed to block 1130.

At block 1130, the boot authentication codes, locally generated code from block 1110 and regenerated code from block 1115, may be securely deleted. This may be performed by, for example, writing all "0" or all "1" or random values of "0" or "1" to the boot authorization code memory locations, destroying the boot authorization codes stored therein. Method 1100 may proceed to block 1135.

In block 1135, server 502 may continue its boot sequence. As some future point (not shown), server 502 may identify that disk encryption keys 904 have been destroyed if, for example, local and reconstituted keys do not match. Furthermore, server 502 may identify that all trays 504 have been locked (if, for example, block 1130 was executed) and access is prohibited. This may also prevent access to the information stored in storage devices 802 if the information used to generate the local copy of the boot authentication code had been modified in the time elapsed since secrets were created from the initial or reference boot authentication code.

Embodiments of the present disclosure may include an apparatus. The apparatus may include a cryptographic key for decrypting content to be read from a storage media. The media may include a control circuit. The control circuit may be implemented by instructions in a non-transitory medium for execution by a processor, a function, library call, subroutine, shared library, software as a service, analog circuitry, digital circuitry, control logic, digital logic circuits programmed through hardware description language, ASIC, FPGA, PLD, or any suitable combination thereof, or any other suitable mechanism, whether in a unitary device or spread over several devices. The control circuit may be configured to, upon a boot of a server, dynamically generate a new boot authentication code using a prescribed method, and to determine a reconstituted boot authentication code. The reconstituted boot authentication code may be reconstituted from an initial boot authentication code that was previously generated using the prescribed method. The control circuit may be configured to compare the new and reconstituted boot authentication codes, and, based on a determination that the new and reconstituted boot authentication codes do not match, take a corrective action.

In combination with any of the above embodiments, the new boot authentication code may be to be obtained using the prescribed method from one or more of a MAC address, system global unique identifier, hardware serial number, or sensitive data including boot code, configuration files, operating system components.

In combination with any of the above embodiments, the new boot authentication code may be a checksum, cryptographic product, or signature of the sensitive data that was subsequently generated upon the boot of the server.

In combination with any of the above embodiments, the control circuit may be further configured to determine the reconstituted boot authentication code from secrets generated from the reconstituted boot authentication code.

In combination with any of the above embodiments, the control circuit may be further configured to reconstitute the boot authentication code from the secrets that were generated by the initial boot authentication code.

In combination with any of the above embodiments, the control circuit may be further configured to, based on a determination that the new and reconstituted boot authentication codes match, continue a system boot sequence.

In combination with any of the above embodiments, the control circuit may be further configured to, based on a determination that the new and reconstituted boot authentication codes do not match, lock further access to the storage media tray and storage media contained therein.

In combination with any of the above embodiments, the control circuit may be further configured to, after comparing the new and reconstituted boot authentication codes match, delete the reconstituted boot authentication.

In combination with any of the above embodiments, 9 the control circuit may be further configured to, based on a determination that the new and reconstituted boot authentication codes do not match, take a corrective action of one or more of deletion of the cryptographic key, locking of a bus communicating with the tray, or erasure of the storage media.

In combination with any of the above embodiments, the control circuit may be further configured to generate the initial boot authentication code using the prescribed method, generate a plurality of secrets derived from the initial boot authentication code, store one or more the plurality of secrets locally in encrypted form or remotely from the apparatus, and delete the initial boot authentication code and any of the plurality of secrets that are unencrypted and local to the apparatus.

In combination with any of the above embodiments, the control circuit may be further configured to reconstitute the reconstituted boot authentication code from secrets derived from the initial boot authentication code, delete the secrets after reconstituting the reconstituted boot authentication code from the secrets, and delete the reconstituted boot authentication code after comparing the new and reconstituted boot authentication codes.

In combination with any of the above embodiments, the control circuit may be further configured to, after comparing the new and reconstituted boot authentication codes match, delete the reconstituted boot authentication.

In combination with any of the above embodiments, the control circuit may be further configured to, based on a determination that the new and reconstituted boot authentication codes do not match, take a corrective action of deletion of the cryptographic key.

In combination with any of the above embodiments, the control circuit may be further configured to, based on a determination that the new and reconstituted boot authentication codes do not match and upon a corrective action of deletion of the cryptographic key, generate a record of deletion of the cryptographic key.

In combination with any of the above embodiments, the control circuit may be further configured to, based on a determination that the new and reconstituted boot authentication codes do not match and upon a corrective action of deletion of the cryptographic key, set a display indicator to indicate that the storage media has been cryptographically erased.

Although example embodiments have been described above, other variations and embodiments may be made from this disclosure without departing from the spirit and scope of these embodiments.

We claim:

1. An apparatus, comprising:
   a cryptographic key for decrypting content to be read from a storage media;
   a control circuit configured to, upon a boot of a server:
   dynamically generate a new boot authentication code using a prescribed method;
   determine a reconstituted boot authentication code, the reconstituted boot authentication code reconstituted from an initial boot authentication code that was previously generated using the prescribed method;
   compare the new and reconstituted boot authentication codes;
   based on a determination that the new and reconstituted boot authentication codes do not match, take a corrective action;
   generate the initial boot authentication code using the prescribed method;
   generate a plurality of secrets derived from the initial boot authentication code;
   store one or more the plurality of secrets locally in encrypted form or remotely from the apparatus; and
   delete the initial boot authentication code and any of the plurality of secrets that are unencrypted and local to the apparatus.

2. The apparatus of claim 1, wherein the new boot authentication code is to be obtained using the prescribed method from one or more of a MAC address, system global unique identifier, hardware serial number, or sensitive data including boot code, configuration files, operating system components.

3. The apparatus of claim 2, wherein the new boot authentication code is a checksum, cryptographic product, or signature of the sensitive data that was subsequently generated upon the boot of the server.

4. The apparatus of claim 1, wherein the control circuit is further configured to determine the reconstituted boot authentication code from secrets generated from the reconstituted boot authentication code.

5. The apparatus of claim 4, wherein the control circuit is further configured to reconstitute the boot authentication code from the secrets that were generated by the initial boot authentication code.

6. The apparatus of claim 1, wherein the control circuit is further configured to, based on a determination that the new and reconstituted boot authentication codes match, continue a system boot sequence.

7. The apparatus of claim 1, wherein the control circuit is further configured to, based on a determination that the new and reconstituted boot authentication codes do not match, lock further access to a storage media tray and the storage media contained therein.

8. The apparatus of claim 1, wherein the control circuit is further configured to, after comparing the new and reconstituted boot authentication codes match, delete the reconstituted boot authentication code.

9. The apparatus of claim 1, wherein the control circuit is configured to, based on a determination that the new and reconstituted boot authentication codes do not match, take a corrective action of one or more of deletion of the cryptographic key, locking of a bus communicating with the storage media, or erasure of the storage media.

10. The apparatus of claim 1, wherein the control circuit is further configured to, based on a determination that the new and reconstituted boot authentication codes do not match, take a corrective action of deletion of the cryptographic key.

11. The apparatus of claim 10, wherein the control circuit is further configured to, based on a determination that the new and reconstituted boot authentication codes do not match and upon a corrective action of deletion of the cryptographic key, generate a record of deletion of the cryptographic key.

12. The apparatus of claim 10, wherein the control circuit is further configured to, based on a determination that the new and reconstituted boot authentication codes do not match and upon a corrective action of deletion of the cryptographic key, set a display indicator to indicate that the storage media has been cryptographically erased.

13. An apparatus, comprising:
   a cryptographic key for decrypting content to be read from a storage media;
   a control circuit configured to, upon a boot of a server:
   dynamically generate a new boot authentication code using a prescribed method;
   determine a reconstituted boot authentication code, the reconstituted boot authentication code reconstituted from an initial boot authentication code that was previously generated using the prescribed method;
   compare the new and reconstituted boot authentication codes;

based on a determination that the new and reconstituted boot authentication codes do not match, take a corrective action;
reconstitute the reconstituted boot authentication code from secrets derived from the initial boot authentication code;
delete the secrets after reconstituting the reconstituted boot authentication code from the secrets; and
delete the reconstituted boot authentication code after comparing the new and reconstituted boot authentication codes.

14. The apparatus of claim 13, wherein the control circuit is further configured to, after comparing the new and reconstituted boot authentication codes match, delete the reconstituted boot authentication code.

15. A method, comprising:
providing a cryptographic key for decrypting content to be read from a storage media;
dynamically generating a new boot authentication code using a prescribed method;
determining a reconstituted boot authentication code, the reconstituted boot authentication code reconstituted from an initial boot authentication code that was previously generated using the prescribed method;
compare the new and reconstituted boot authentication codes;
based on a determination that the new and reconstituted boot authentication codes do not match, taking a corrective action;
generating the initial boot authentication code using the prescribed method;
generating a plurality of secrets derived from the initial boot authentication code;
storing one or more the plurality of secrets locally in encrypted form or remotely from the apparatus; and
deleting the initial boot authentication code and any of the plurality of secrets that are unencrypted and local to the apparatus.

16. The method of claim 15, wherein the new boot authentication code is to be obtained using the prescribed method from one or more of a MAC address, system global unique identifier, hardware serial number, or sensitive data including boot code, configuration files, operating system components.

17. The method of claim 16, wherein the new boot authentication code is a checksum, cryptographic product, or signature of the sensitive data that was subsequently generated upon the boot of the server.

18. The method of claim 15, further comprising determining the reconstituted boot authentication code from secrets generated from the reconstituted boot authentication code.

19. The method of claim 18, further comprising reconstituting the boot authentication code from the secrets that were generated by the initial boot authentication code.

20. The method of claim 15, further comprising, based on a determination that the new and reconstituted boot authentication codes match, continuing a system boot sequence.

21. The method of claim 15, further comprising, based on a determination that the new and reconstituted boot authentication codes do not match, locking further access to a storage media tray and the storage media contained therein.

22. The method of claim 15, further comprising, after comparing the new and reconstituted boot authentication codes match, deleting the reconstituted boot authentication code.

23. The method of claim 15, further comprising, based on a determination that the new and reconstituted boot authentication codes do not match, taking a corrective action of one or more of deletion of the cryptographic key, locking of a bus communicating with the storage media, or erasure of the storage media.

24. The method of claim 15, further comprising, based on a determination that the new and reconstituted boot authentication codes do not match, taking a corrective action of deletion of the cryptographic key.

25. The method of claim 24, further comprising, based on a determination that the new and reconstituted boot authentication codes do not match and upon a corrective action of deletion of the cryptographic key, generating a record of deletion of the cryptographic key.

26. The method of claim 24, further comprising, based on a determination that the new and reconstituted boot authentication codes do not match and upon a corrective action of deletion of the cryptographic key, setting a display indicator to indicate that the storage media has been cryptographically erased.

27. A method, comprising:
providing a cryptographic key for decrypting content to be read from a storage media;
dynamically generating a new boot authentication code using a prescribed method;
determining a reconstituted boot authentication code, the reconstituted boot authentication code reconstituted from an initial boot authentication code that was previously generated using the prescribed method;
compare the new and reconstituted boot authentication codes;
based on a determination that the new and reconstituted boot authentication codes do not match, taking a corrective action;
reconstituting the reconstituted boot authentication code from secrets derived from the initial boot authentication code;
deleting the secrets after reconstituting the reconstituted boot authentication code from the secrets; and
deleting the reconstituted boot authentication code after comparing the new and reconstituted boot authentication codes.

28. The method of claim 27, further comprising, after comparing the new and reconstituted boot authentication codes match, deleting the reconstituted boot authentication code.

* * * * *